(12) United States Patent
Go et al.

(10) Patent No.: US 6,976,795 B2
(45) Date of Patent: Dec. 20, 2005

(54) OPTICAL DEVICE AND OPTICAL MODULE

(75) Inventors: Hisao Go, Yokohama (JP); Toshiaki Kihara, Yokohama (JP); Eiji Tsumura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/682,306

(22) Filed: Oct. 10, 2003

(65) Prior Publication Data

US 2004/0120660 A1 Jun. 24, 2004

(30) Foreign Application Priority Data

Oct. 10, 2002 (JP) .......................... P2002-297652
Aug. 28, 2003 (JP) .......................... P2003-305339

(51) Int. Cl.[7] ................................................ G02B 6/36
(52) U.S. Cl. ............................. 385/92; 385/53; 385/89
(58) Field of Search ................................... 385/88–92

(56) References Cited

U.S. PATENT DOCUMENTS

| | | | |
|---|---|---|---|
| 5,307,519 A * | 4/1994 | Mehta et al. ............. | 455/343.1 |
| 5,632,630 A | 5/1997 | Card et al. | |
| 5,742,480 A | 4/1998 | Sawada et al. | |
| 5,812,716 A * | 9/1998 | Ohishi ..................... | 385/92 |
| 5,943,461 A | 8/1999 | Shahid | |
| 6,025,992 A * | 2/2000 | Dodge et al. ............. | 361/704 |
| 6,459,842 B1 * | 10/2002 | Arsenault et al. .......... | 385/134 |
| 6,712,527 B1 * | 3/2004 | Chan et al. ............... | 385/88 |
| 2001/0024551 A1 | 9/2001 | Yonemura et al. | |
| 2003/0021310 A1 | 1/2003 | Harding | |

FOREIGN PATENT DOCUMENTS

| | | |
|---|---|---|
| EP | 1 329 753 | 7/2003 |
| JP | P09-005582 | 1/1997 |
| JP | P09-138329 | 5/1997 |
| JP | P09-197158 | 7/1997 |
| JP | P11-026662 | 1/1998 |

* cited by examiner

*Primary Examiner*—Frank G. Font
*Assistant Examiner*—Eric Wong
(74) *Attorney, Agent, or Firm*—McDermott Will & Emery LLP

(57) ABSTRACT

An optical device has a package enclosing an LD and a driver circuit for driving the LD. The package has a laminated ceramic wiring board fixed on the top surface of a bottom plate. A sleeve, which is able to receive a ferrule of an optical connector plug, is attached to the front surface of the package. A flexible heat-dissipating sheet is disposed on the bottom surface of the bottom plate. The sheet dissipates heat generated in the package to the body of the optical module.

17 Claims, 25 Drawing Sheets

OPTICAL DEVICE AND OPTICAL MODULE

BACKGROUND OF THE INVENTION

1. Field of the Invention

The present invention relates to an optical device and an optical module for optical transmission.

2. Related Background Art

The optical module having an optical transmitting device and an optical receiving device to be connected to a connector ferrule by way of an optical fiber is disclosed in U.S. Pat. No. 5,943,461

The tolerable bending radius of an optical fiber is on the order of 25 to 30 mm in general because the optical fiber may incur bending loss or lower its reliability. To ensure such a large tolerable bending radius of the optical fiber, a large space for containing the optical fiber is necessary in the optical module, which makes the optical module bulky.

SUMMARY OF THE INVENTION

In one aspect, the present invention relates to an optical device. The optical device comprises a package enclosing an optical element, a sleeve for receiving a ferrule in which an optical fiber is held, and a flexible sheet for dissipating heat generated in the package. The sleeve is provided on the package. The flexible sheet is attached to the package.

In another aspect, the present invention relates to an optical module. The optical module comprises a body having a receptacle for receiving an optical connector plug, and the above optical device disposed in the body.

The body may have a wall with a through hole into which the sleeve on the package is inserted.

A protrusion for positioning the sleeve may be provided on an outer surface thereof, and the body may have a wall abutting the protrusion to position the sleeve.

The flexible sheet may be electrically conductive, and the package may have a surface in contact with the sheet. The body may have a portion in contact with the sheet, and the portion may have the same electrical potential as the surface of the package. The surface may be at ground potential.

The optical device may further comprise a wiring board attached to the package. The printed board is electrically connected to the optical element. The wiring board may be made of laminated ceramic.

The optical element may be a light-emitting element for transmitting an optical signal. The package may enclose a driver circuit for driving the light-emitting element.

The package may enclose a thermo-electronic element for adjusting the temperature of the light-emitting element. The light-emitting element may be an EA-DFB element which has characteristics strongly dependent on ambient temperature. Also, the optical device may be applied to optical transmitters for a wavelength division multiplexing (WDM) communication which requires precise wavelength control.

The optical element may be a light-receiving element for receiving an optical signal. The package may enclose an amplifier circuit for amplifying an output signal of the light-receiving element.

The package may have a mount made of thermal conductive material, and the optical element may be disposed on the mount. The package may have a bottom plate with the top surface on which the mount are placed and the bottom surface to which the flexible sheet is attached. The wiring board may be placed on the top surface of the bottom plate. An electrically insulating plate may be disposed between the bottom plate and the mount so as to electrically isolate the flexible sheet from the mount.

The wiring board may include the lowermost layer on which the mount is placed. Alternatively, the flexible sheet may be attached to a bottom surface of the wiring board, and the mount may be disposed on the lowermost layer of the wiring board.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
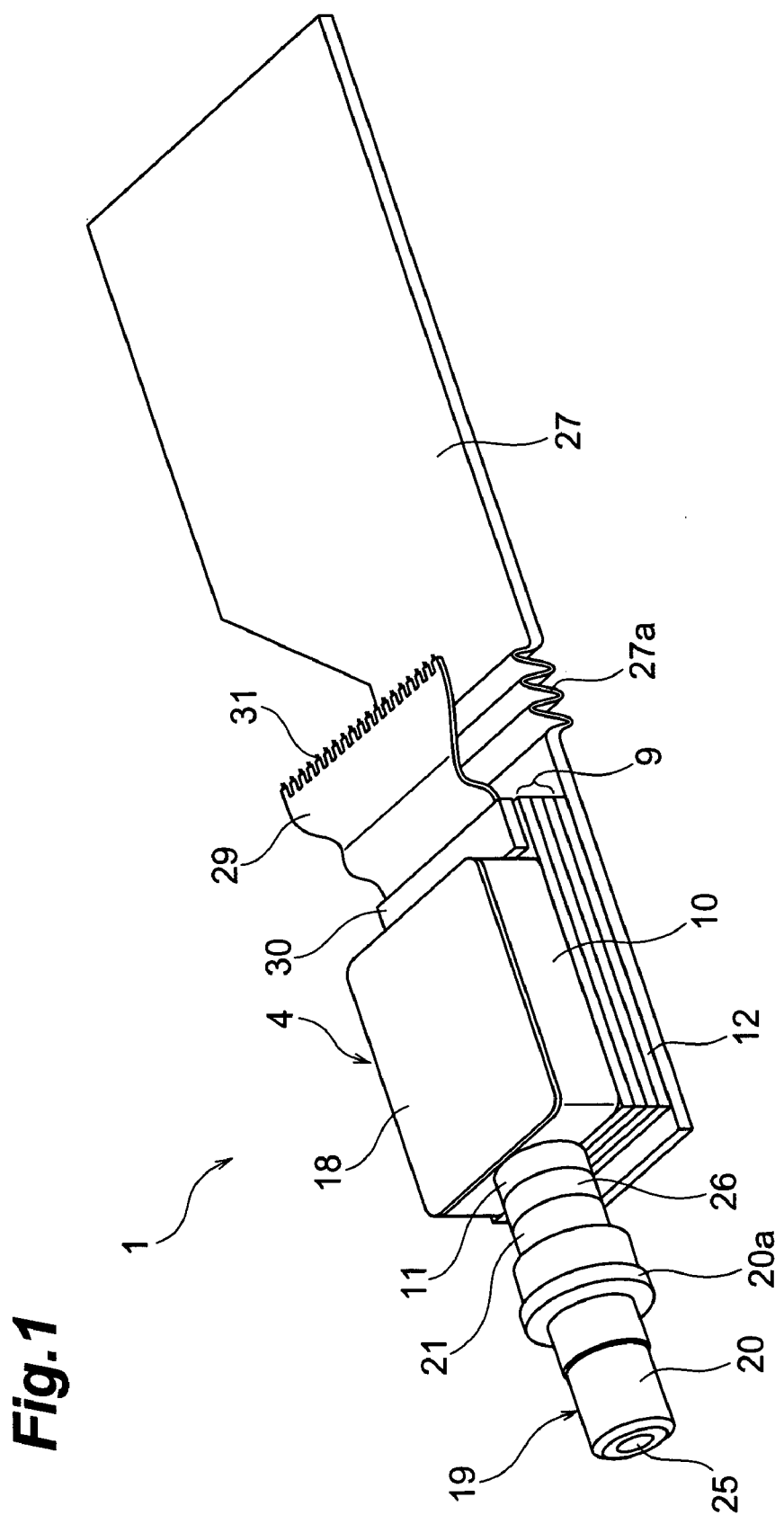
FIG. 1 is a perspective view showing an embodiment of the optical device in accordance with the present invention.

The preferred embodiments of the present invention will be described below in detail with reference to the accompanying drawings. To facilitate understanding, identical reference numerals are used to designate identical or equivalent elements that are common to the embodiments, and, in subsequent embodiments, these elements will not be further explained.

First Embodiment

FIG. 1 is a perspective view showing a first embodiment of the optical device in accordance with the present invention. The optical device 1 is an optical transmitting device for high speed optical transmission (e.g., 10 Gbps). The optical transmitting device 1 is disposed in a body 3 of an optical module 2 shown in FIG. 2.

Figure 2:
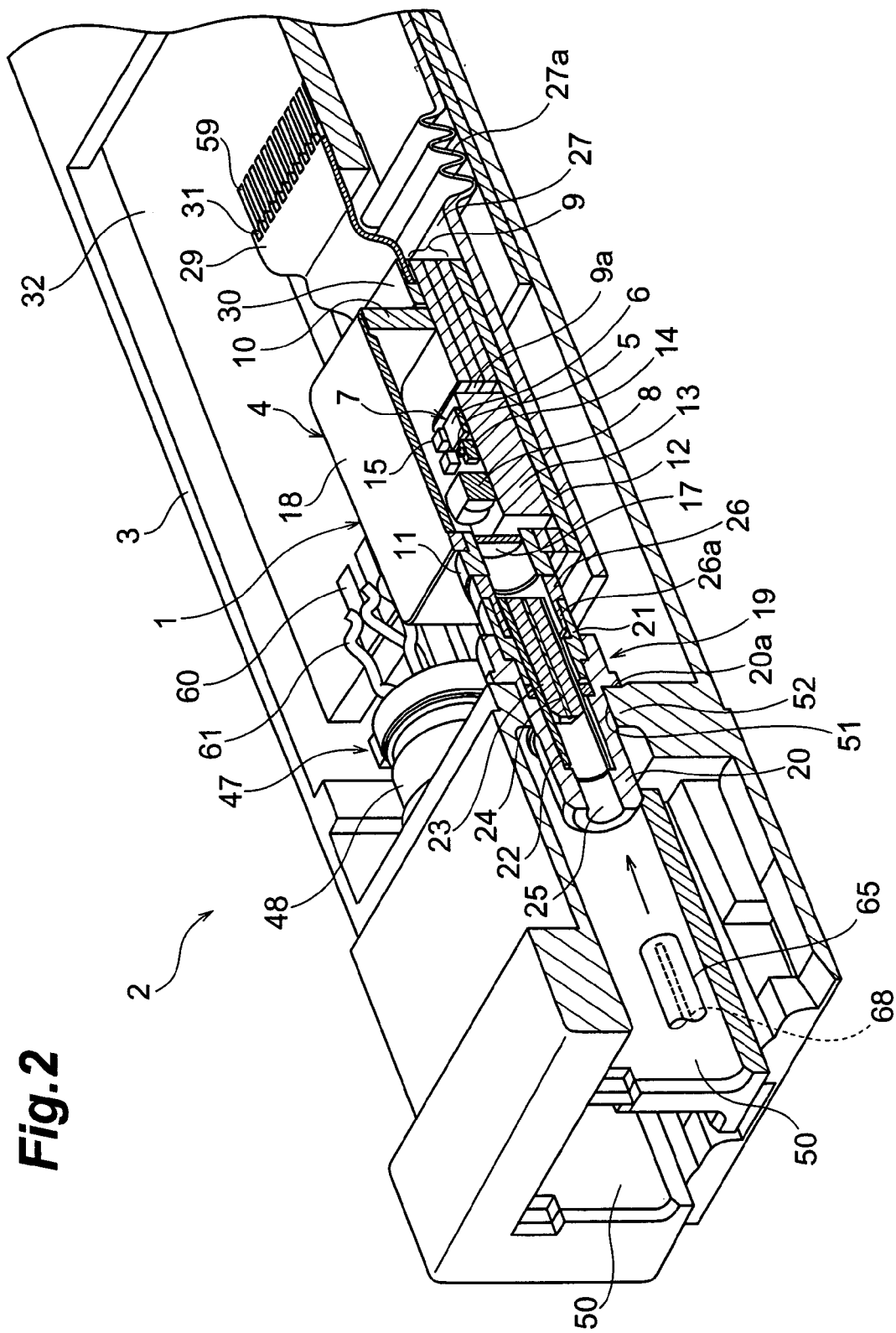
FIG. 2 is a partially sectional perspective view showing an optical module having the optical device shown in FIG. 1.
Figure 3:
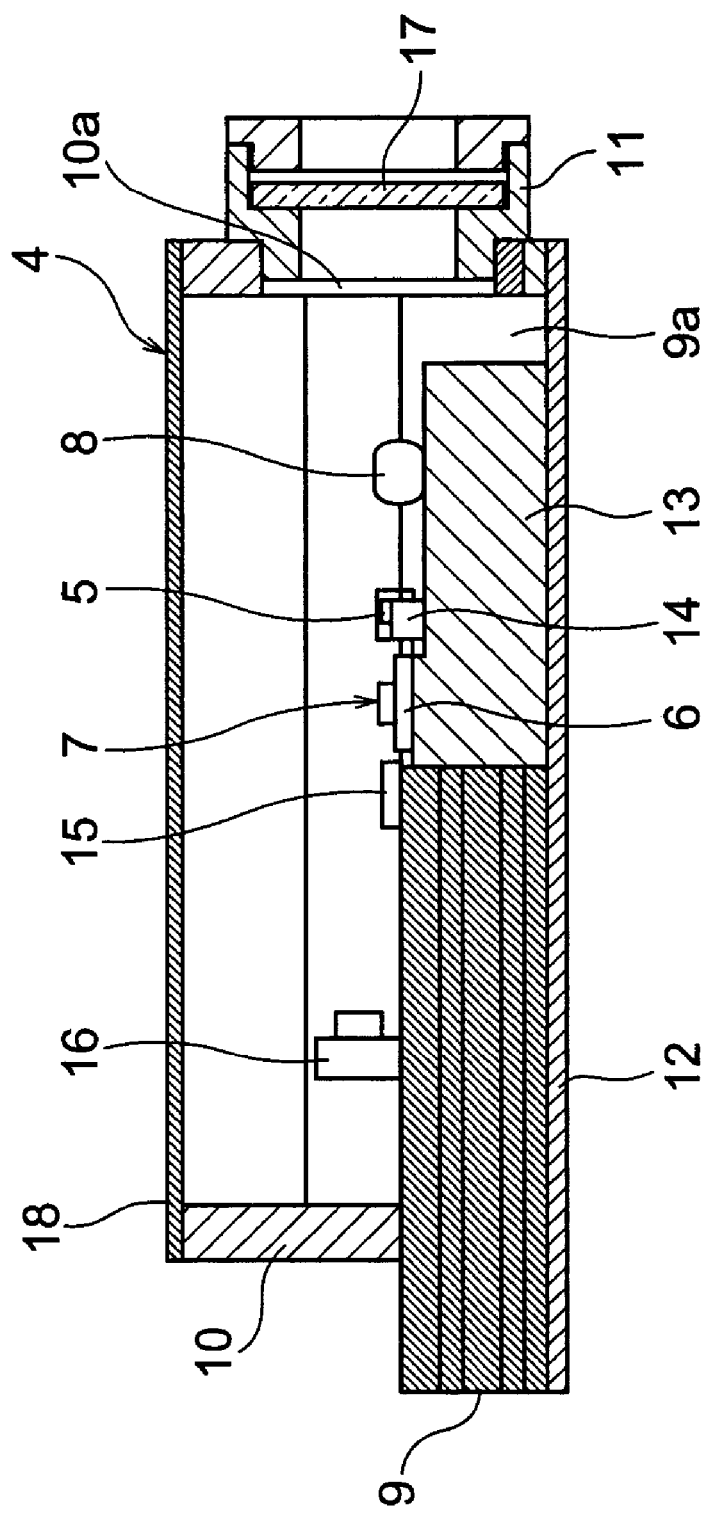
FIG. 3 is a sectional view of the package shown in FIG. 1.

The optical transmitting device 1 includes a package 4. As shown in FIGS. 2 and 3, the package 4 encloses a laser diode (LD) 5 as a light-emitting element, a driver circuit 7 including an IC 6 for driving the LD 5, and a lens 8 for converting light generated by the LD 5 into convergent light.

The package 4 has a wiring board 9 which is made of laminated ceramic and including stacked layers each having one or more wiring patterns (not shown), and a frame 10 fixed on the top surface of the wiring board 9. An aperture 10a for transmitting light from the LD 5 is formed through the front wall of the frame 10. A pipe 11 is disposed on the front surface of the frame 10 so as to be connected to the aperture 10a. Both the frame 10 and pipe 11 are made of metal. These components are preferably made of Kovar™ in order to match thermal expansion coefficients between these components and the wiring board 9 made of alumina, thereby reducing thermal strain. The wiring board 9, frame 10, and pipe 11 are assembled using silver brazing so as to ensure airtightness between these components.

The wiring board 9 is fixed on the top surface of a bottom plate 12. The wiring board 9 has a cavity 9a formed through the board 9, and a mount 13 known as a chip carrier is disposed in the cavity 9a. The mount 13 is also fixed on the top surface of the bottom plate 12.

The LD 5 is mounted on a heat sink 14 placed on the top surface of the mount 13. The IC 6 is also mounted on the top surface of the mount 13. When necessary, a circuit board may be disposed on the mount 13 and the IC 6 may be placed on the circuit board. When the LD 5 and IC 6 are disposed on the same mount 13, they can be connected to each other in a short distance, which reduces undesirable inductance between the LD 5 and IC 6, thereby suppressing deterioration of the quality of the light emitted from the LD 5.

The lens 8 is mounted on the top surface of the mount 13, and facing a front surface of the LD 5. An electrical component 15, such as a capacitor, may be mounted on the top surface of the mount 13 or that of the wiring board 9. Further, a light-receiving element (e.g., photodiode) 16, which is used for receiving and monitoring the backward light of the LD 5, is mounted on the top surface of the wiring board 9 and facing a rear surface of the LD 5. The driver circuit 7, the LD 5, and the wiring board 9 are electrically connected to each other with bonding wires (not shown).

Since the LD 5, which is a heat-generating source, heat sink 14 and IC 6 are placed on the mount 13, the mount 13 preferably has sufficient volume and thermal conductivity. Since Si, GaAs or the like is a base material of the IC 6 and the IC 6 is thin in general, i.e., with thickness from 100 to 200 $\mu$m, excessive thermal stress may cause a cracking of the IC. In particular, when the IC 6 is die-bonded to the mount 13, a high temperature on the order from 200° C. to 330° C. is exerted, and the thermal stress is likely to be excessive. On the other hand, the heat sink 14 is in general made of AlN, which is insulating material having high thermal conductivity. Minute displacement caused by the thermal stress between the heat sink 14 and the mount 13 affects the optical coupling efficiency. Therefore, it is necessary to reduce the thermal stress between the mount 13 and the heat sink 14. In view of the foregoing, CuW (containing 10% of Cu, for example) is most suitable material for the mount 13.

The bottom plate 12 may be made of metal such as Kovar™ or CuW, or insulating material such as alumina or AlN. The material of the bottom plate 12 is selected according to whether electrical conductivity is necessary between the mount 13 and the bottom plate 12 (and also between the mount 13 and a heat-dissipating sheet 27 which will be explained later), and according to heat-dissipating performance required. For example, electrically conductive material is used when the mount 13 is at signal GND (ground), whereas electrically insulating material is used when the mount 13 is at power source (±5 V, ±3.3 V, etc.).

A sealed window 17 made of transparent material (e.g., sapphire) is disposed in the pipe 11. The window 17 is attached to the pipe 11 using brazing material (e.g., AuGe), thereby ensuring airtightness. The light emitted from the LD 5 is converged by the lens 8 so as to be guided out of the package 4 through the window 17.

A lid 18 made of Kovar™, FeNi alloy or the like is provided on the top of the frame 10. After mounting the LD 5, driver circuit 7, lens 8 and the lid 18 is welded to the frame 10. This ensures hermetic sealing of the package 4.

The bottom surface of the bottom plate 12, the top surface of the lid 18, and the top surface of the wiring board 9 are parallel to each other, and the front and rear surfaces and both side surfaces of the frame 10 are perpendicular to these bottom and top surfaces.

A sleeve 19 is attached to the distal end of the pipe 11. The sleeve 19 is used to receive a ferrule 65 holding an optical fiber 68 therein, as shown in FIG. 2. The ferrule 65 is a part of an optical connector 49 (see FIG. 9) which will be explained later.

As shown in FIG. 2, the sleeve 19 includes a metal barrel 20 with a flange 20a on the outer surface thereof. A bushing 21 is disposed within the barrel 20 and extends toward the proximal end of the barrel 20. A split sleeve 22 is disposed within the bushing 21 and protrudes toward the distal end of the barrel 20 from the bushing 21. A capillary 23 is disposed within the split sleeve 22. An optical fiber 24 for guiding the light from the LD 5 is disposed and held within a minute through hole formed in the capillary 23 along the center axis thereof. The four components mentioned above, i.e., the barrel 20, bushing 21, split sleeve 22, and capillary 23, are coaxially assembled by press fitting or the like. Thus formed sleeve 19 has a hollow part 25 in its distal end portion, and the ferrule 65 of the optical connector 49 (see FIG. 9) fits into the hollow part 25.

An alignment sleeve 26 is disposed at the proximal end portion of the sleeve 19. The alignment sleeve 26 has the distal end portion 26a configured so as to be insertable between the bushing 21 and the split sleeve 22. The inner diameter of the bushing 21 and the outer diameter of the distal end portion 26a of the alignment sleeve 26 have a clearance-fitting relationship therebetween (a few $\mu$m), so that the alignment sleeve 26 is able to slide along the center axis of the sleeve 19.

When connecting the sleeve 19 to the pipe 11, the pipe 11 and the bushing 21 are aligned with each other along three axes so that the optical axis of the optical fiber 24 in the sleeve 19 is aligned with that of the LD 5 in the package 4. The sleeve 19 and the pipe 11 are fixed to each other by laser welding or the like. This can ensure desirable optical coupling efficiency.

A second lens and/or an optical isolator may be disposed between the alignment sleeve 26 and the pipe 11. If the second lens is disposed there, it is preferable that the first lens 8 converts the light emitted from the LD 5 into substantially parallel light.

A flexible heat-dissipating sheet 27 is attached to the bottom surface of the bottom plate 12 of the package 4. The sheet 27 dissipates the heat generated in the package 4 by the LD 5 and IC 6 to the body 3. The sheet 27 is made of flexible material with high thermal conductivity such as metal material (e.g., Cu) or graphite.

The heat-dissipating sheet 27 includes a corrugated portion 27a. The sheet 27 may be thick, depending on required heat-dissipating performance, in order to reduce the thermal resistance of the sheet 27. Even in this case, the sheet 27 can have enough flexibility because of its corrugated portion 27a. The corrugated portion 27a may not be provided when the flexibility of the sheet 27 can be secured.

Figure 4:
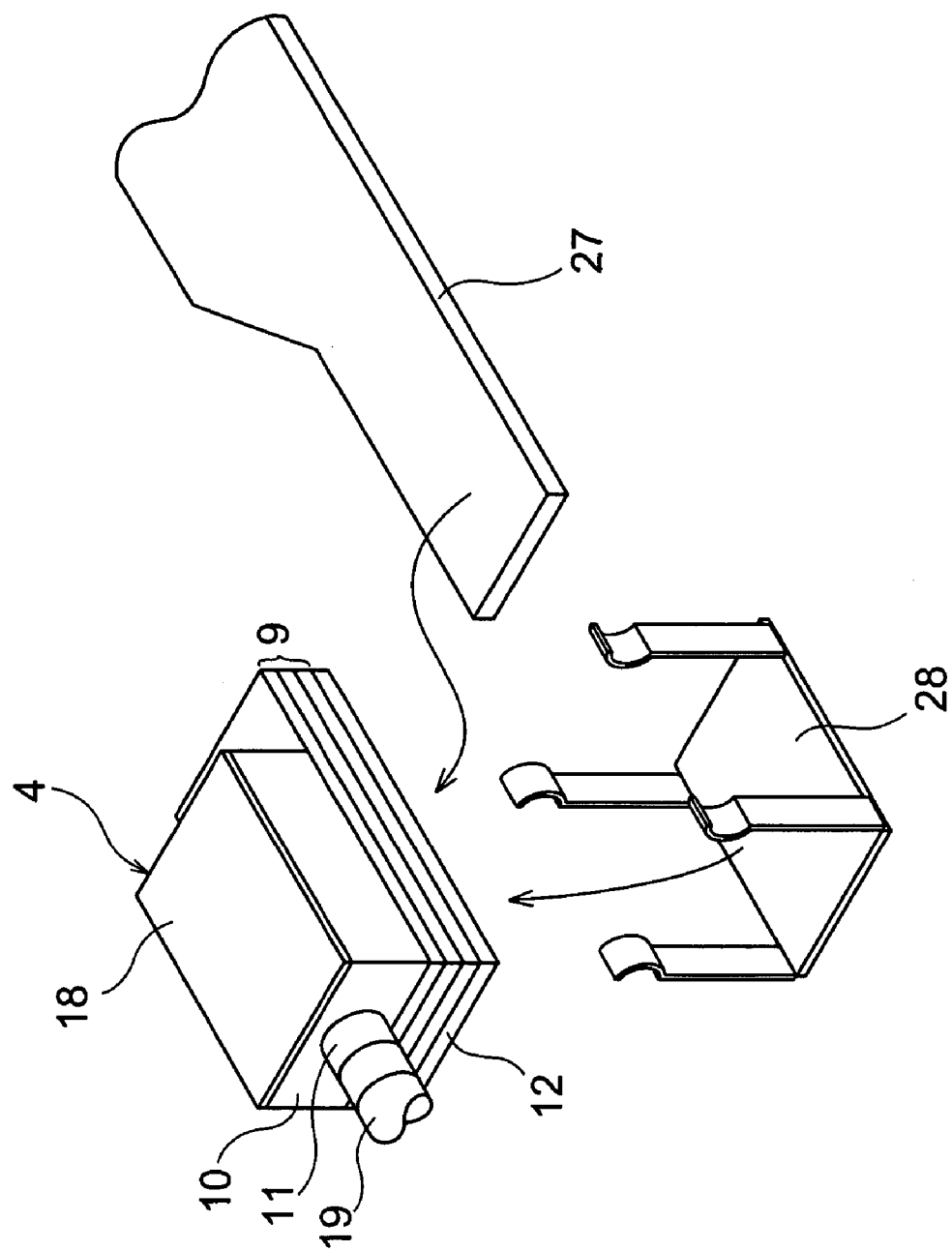
FIG. 4 is a view showing an example of the mechanics for fixing a heat-dissipating sheet to the package shown in FIG. 1.

The heat-dissipating sheet 27 and the bottom plate 12 are fixed to each other by soldering (brazing) or adhesive. The adhesive may be selected between electrically conductive adhesive and electrically insulating adhesive depending on designing of the driver circuit. As shown in FIG. 4, a clip 28 made of elastic material may be prepared, and one end of the heat-dissipating sheet 27 is held between the clip 28 and the package 4.

The heat of the package 4 is dissipated to the body 3 through the heat-dissipating sheet 27 even in the case when power consumption increases, for example, to about 1 W by the IC 6. This can prevent deterioration of the LD 5 caused by rising of the temperature.

One end of a flexible printed board 29, which is an electrical wiring board, is attached to the top surface of the wiring board 9 by way of a rigid board 30. The flexible printed board 29 is electrically connected to the driver circuit 7 via the wiring patterns (not shown) formed on the surface layer and inner layers of the wiring board 9. The opposite end of the printed board 29 has a comb-shaped electrode 31. As shown in FIG. 2, the comb-shaped electrode 31 is electrically connected to an electronic circuit board 32 disposed within the body 3.

The flexible printed board 29 is composed of insulating members of laminated polyimide and metal wiring members made of Cu. The rigid board 30 is composed of laminating resin members, which is made of FR4, for example.

Control signals, monitor signals and power are transferred between the driver circuit 7 and a device outside the package 4, such as the electronic circuit board 32, by way of the wiring patterns of the wiring board 9 and the flexible printed board 29.

Figure 5:
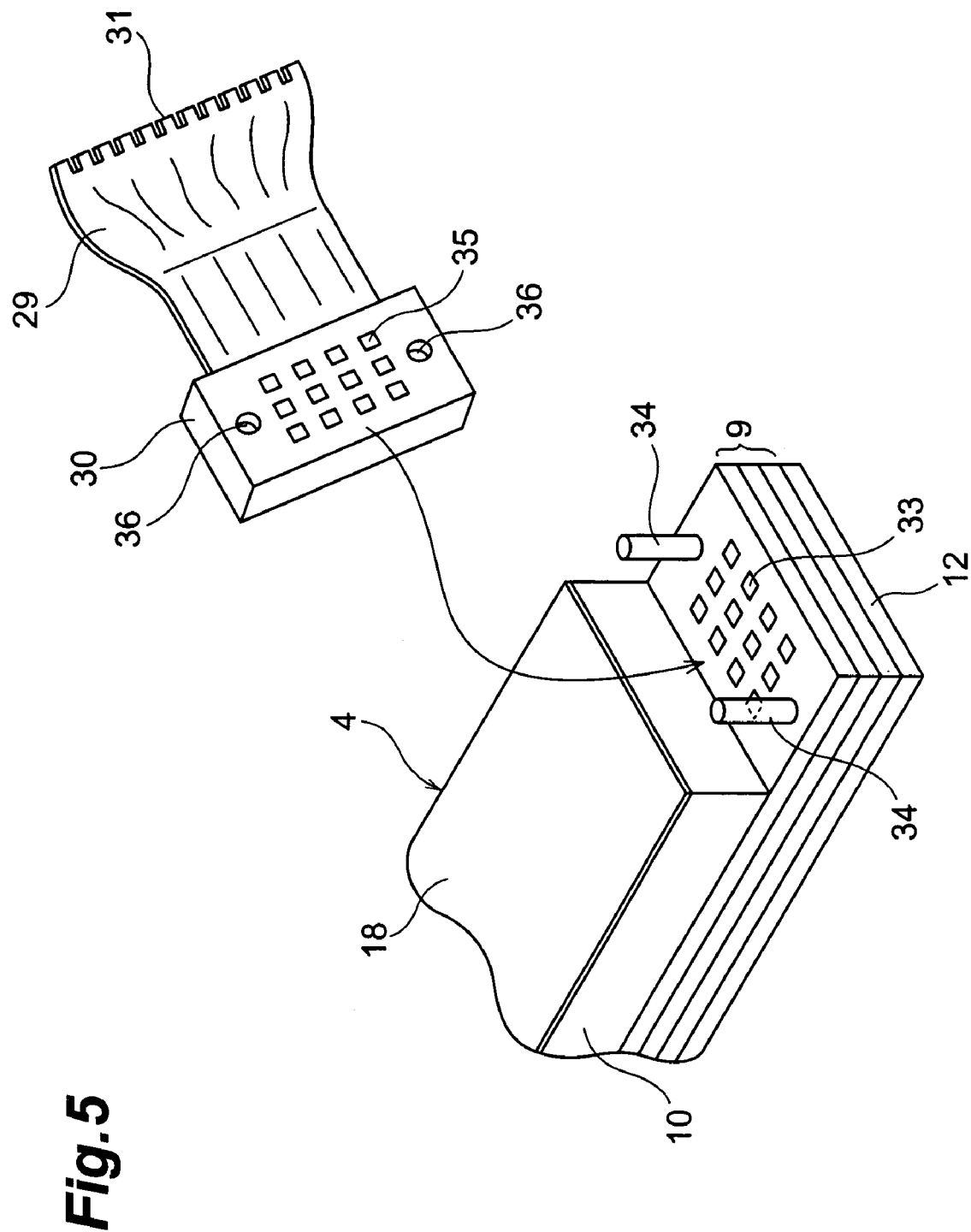
FIG. 5 is a view showing an example of the mechanics for connecting a flexible printed board to the laminated ceramic wiring board shown in FIG. 1.

FIG. 5 shows an example of the mechanics for fixing the flexible printed board 29 and the package 4 to each other. The top surface of the wiring board 9 has a plurality of lands 33 and two positioning pins 34. The bottom surface of the rigid board 30 has a plurality of lands 35 to be joined to the respective lands 33, and two through holes 36 into which the respective positioning pins 34 are to be inserted.

Solder balls are placed on either the lands 33 or 35, and then the rigid board 30 and the wiring board 9 are connected together by thermo-compression bonding. Alternatively, gold balls are placed on either the lands 33 or 35, and then the rigid board 30 and the wiring board 9 are connected together by thermo-compression bonding with an anisotropic conductive film interposed between the boards 30 and 9. These bonding techniques are generally known as so-called BGA (Ball Grid Array) bonding.

The positioning pins 34 may be placed on the back surface of the rigid board 30, and the through holes 36 may be formed in the wiring board 9. The flexible printed board 29 and the wiring board 9 may be connected together by way of solder balls without the rigid board 30.

Figure 6:
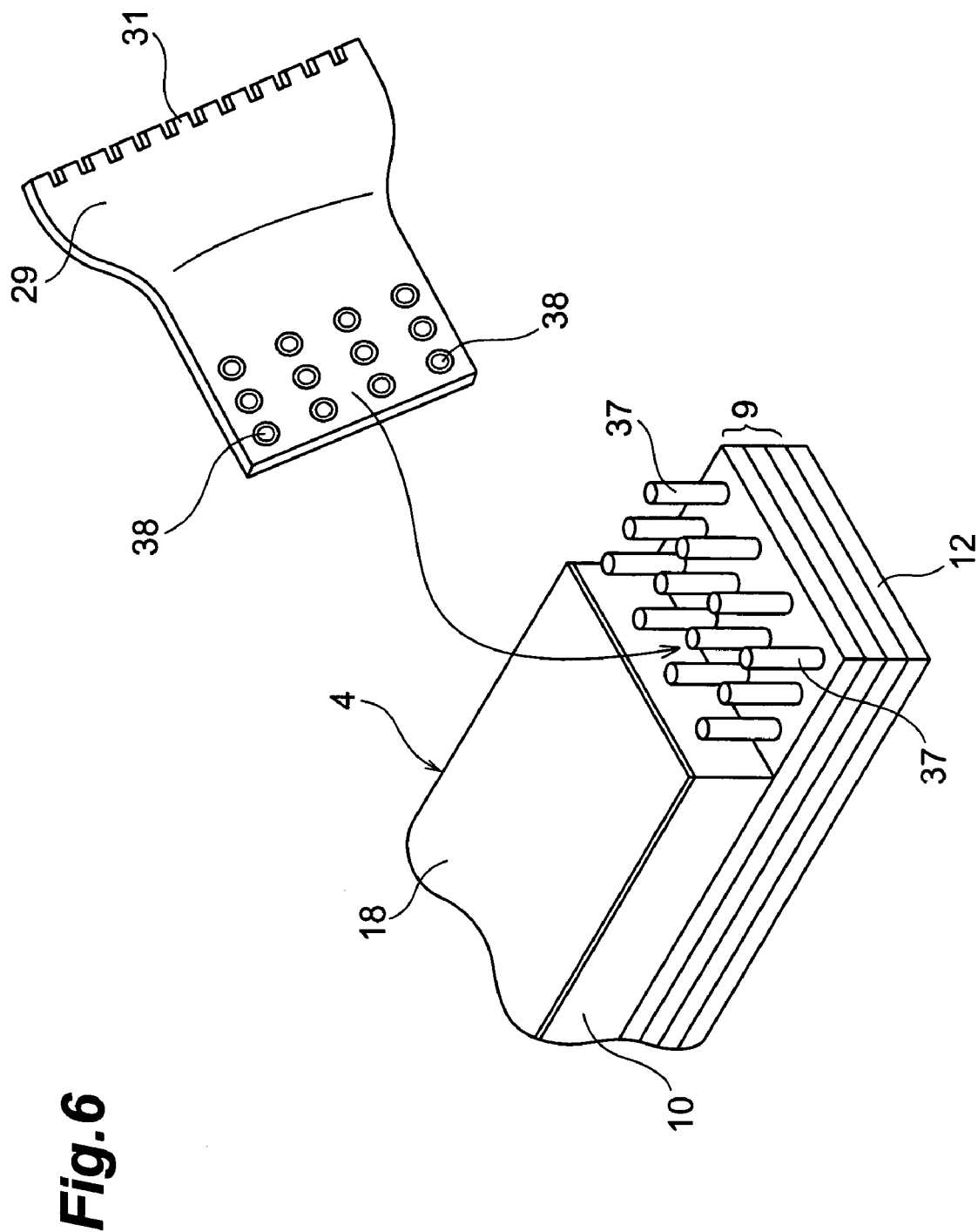
FIG. 6 is a view showing another example of the mechanics for connecting the flexible printed board to the laminated ceramic wiring board shown in FIG. 1.

FIG. 6 shows another example for fixing the flexible printed board 29 and the package 4 to each other. As shown in FIG. 6, the top surface of the wiring board 9 has a plurality of lead pins 37. The flexible printed board 29 has a plurality of lands 38 with respective through holes into which respective lead pins 37 are to be inserted. Each lead pin 37 and its corresponding land 38 are soldered together so as to connect the flexible printed board 29 to the wiring board 9 together.

The rigid board may be attached to one end of the flexible printed board 29, and a plurality of lands 38 may be provided on the rigid board, similarly to the configuration shown in FIG. 5.

In FIGS. 5 and 6, a board-joining portion, which is to be joined to the flexible printed board 29 or rigid board 30, of the top surface of the wiring board 9 is provided only at the rear end of the package 4; however, the present invention is not limited to this configuration.

Figure 7:
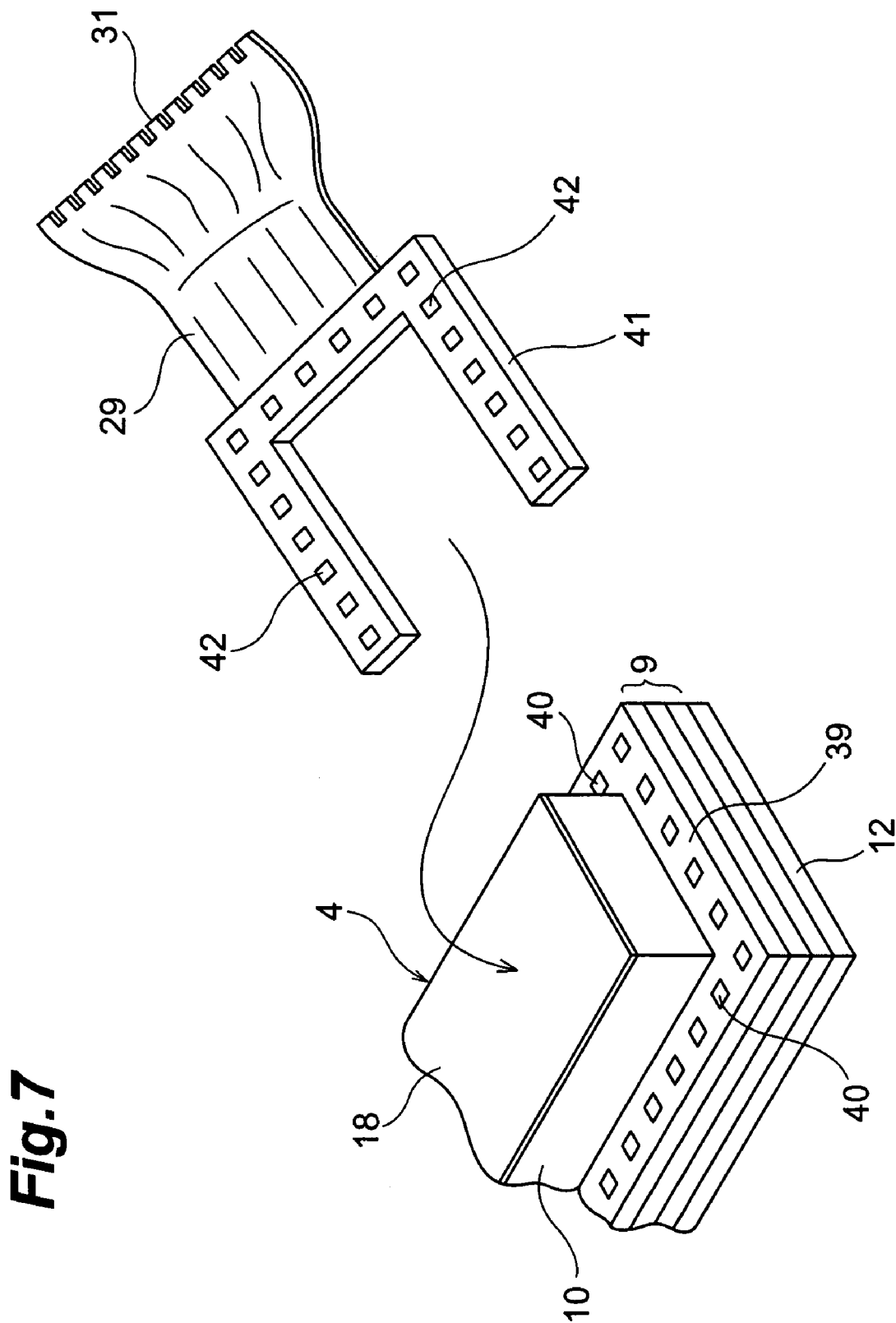
FIG. 7 is a view showing still another example of the mechanics for connecting the flexible printed board to the laminated ceramic wiring board shown in FIG. 1.

For example, as shown in FIG. 7, the U-shaped board-joining portion 39 with a plurality of lands 40 may be formed at the rear and the both sides of the top surface of the wiring board 9. In this case, a U-shaped rigid board 41 with a plurality of lands 42 may be attached to one end of the flexible printed board 29. Alternatively, the L-shaped board-joining portion may be formed at the rear edge and one of the side edges of the top surface of the wiring board 9, and an L-shaped rigid board may be attached to one end of the flexible printed board 29. The selectivity of configurations increases the flexibility of designing the width and length of the optical transmitting device 1, and therefore the space in the optical module 2 can be utilized effectively.

The optical module 2 including the optical transmitting device 1 will now be described.

Figure 8:
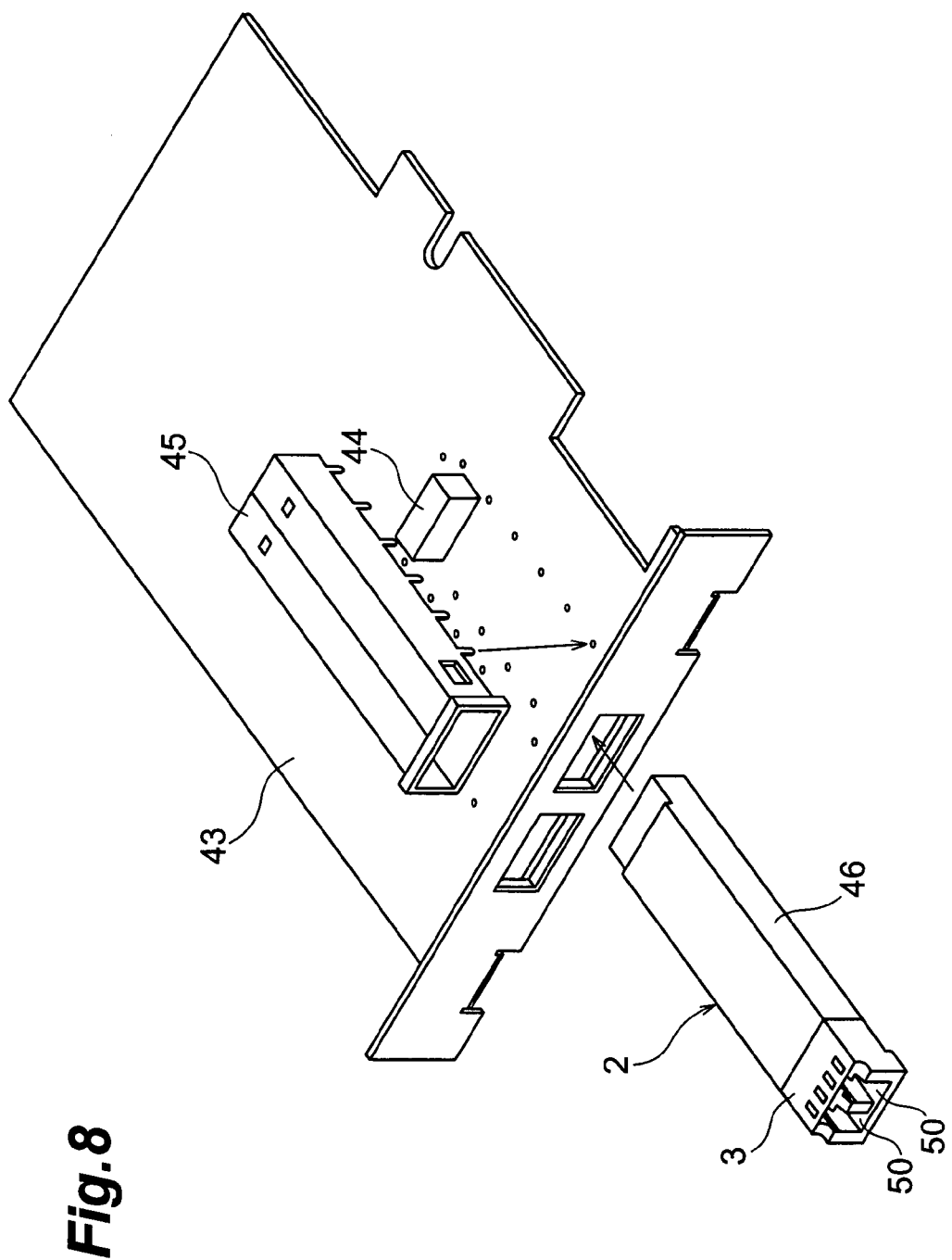
FIG. 8 is a perspective view showing the mechanics for attaching the optical module shown in FIG. 2 to a board.

As shown in FIG. 8, the optical module 2 is a so-called hot-pluggable optical module which can be attached to and detached from a board 43. A host connector 44 and a cage 45 securing the optical module 2 are disposed on the board 43. When attaching the optical module 2 to the board 43, the optical module 2 is inserted into the cage 45 so as to be connected with the host connector 44, as shown in FIG. 9.

Figure 10:
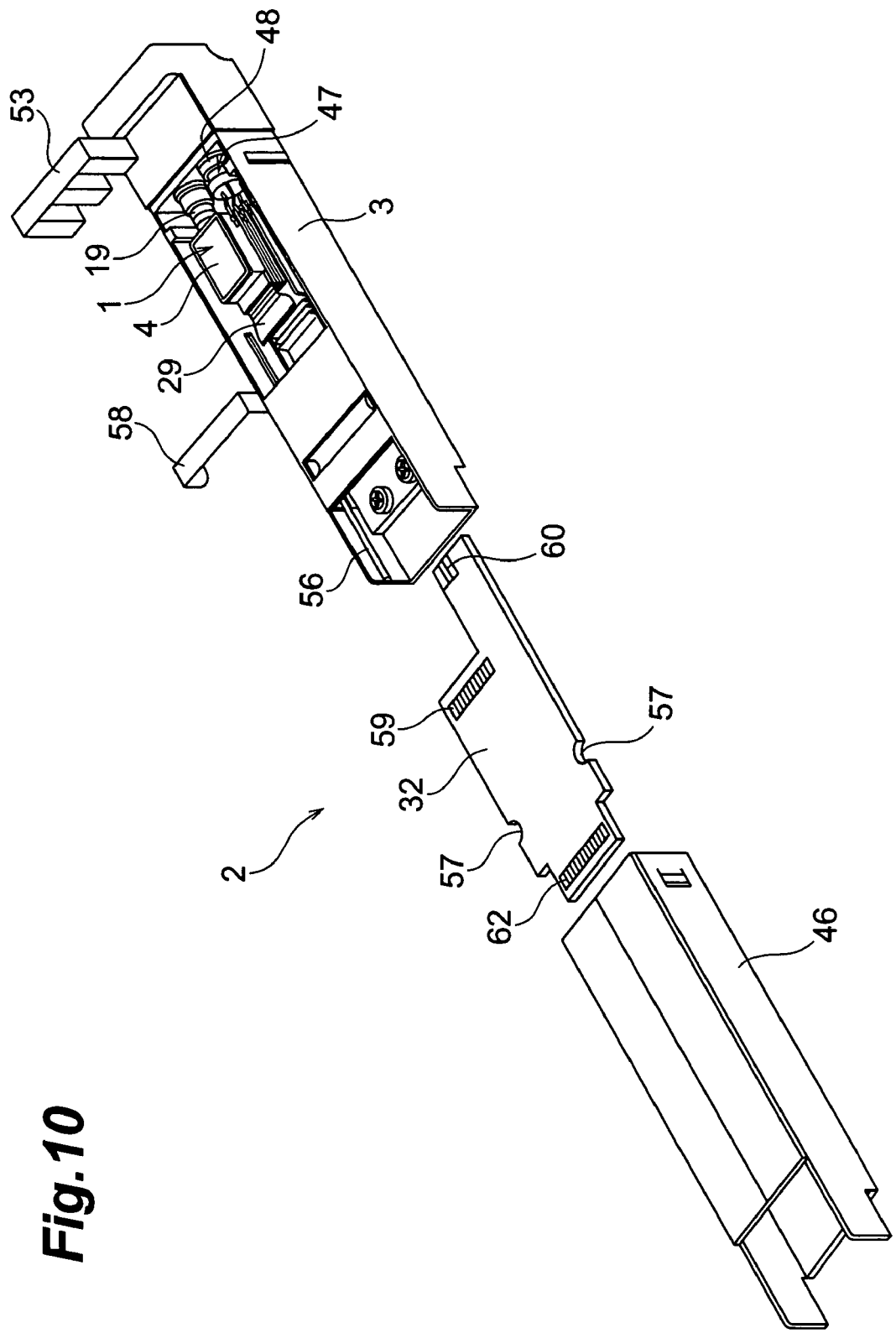
FIG. 10 is an exploded perspective view of the optical module shown in FIG. 8.

As shown in FIG. 10, the optical module 2 has the body 3 and a cover 46 for the body 3. The body 3 and the cover 46 are made of metal. The optical transmitting device 1 and an optical receiving device 47 are disposed within the body 3.

Figure 9A:
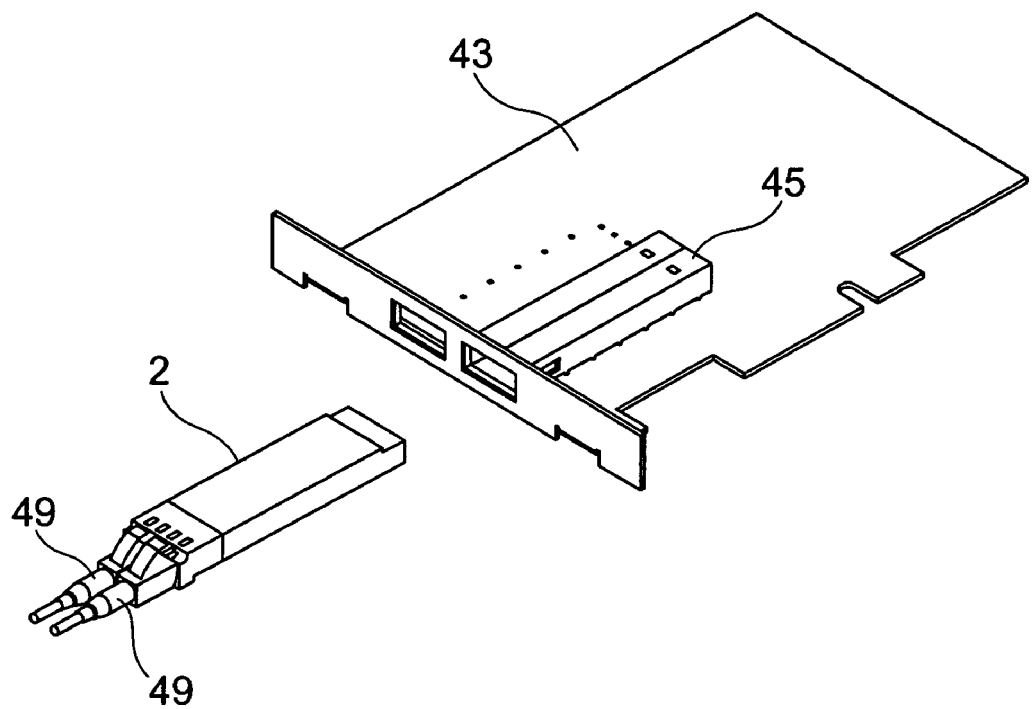
FIGS. 9A and 9B are perspective views showing detaching/attaching the optical module from/to the board shown in FIG. 8.
Figure 9B:
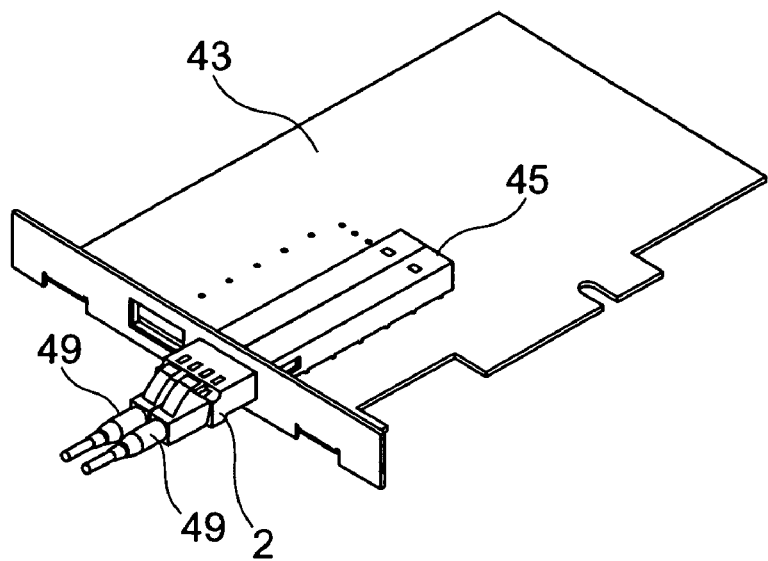

As shown in FIGS. 2 and 8, the front end of the body 3 has receptacles 50 for receiving optical connectors 49 (see FIG. 9). Each optical connector 49 is an LC connector, for example.

Figure 11:
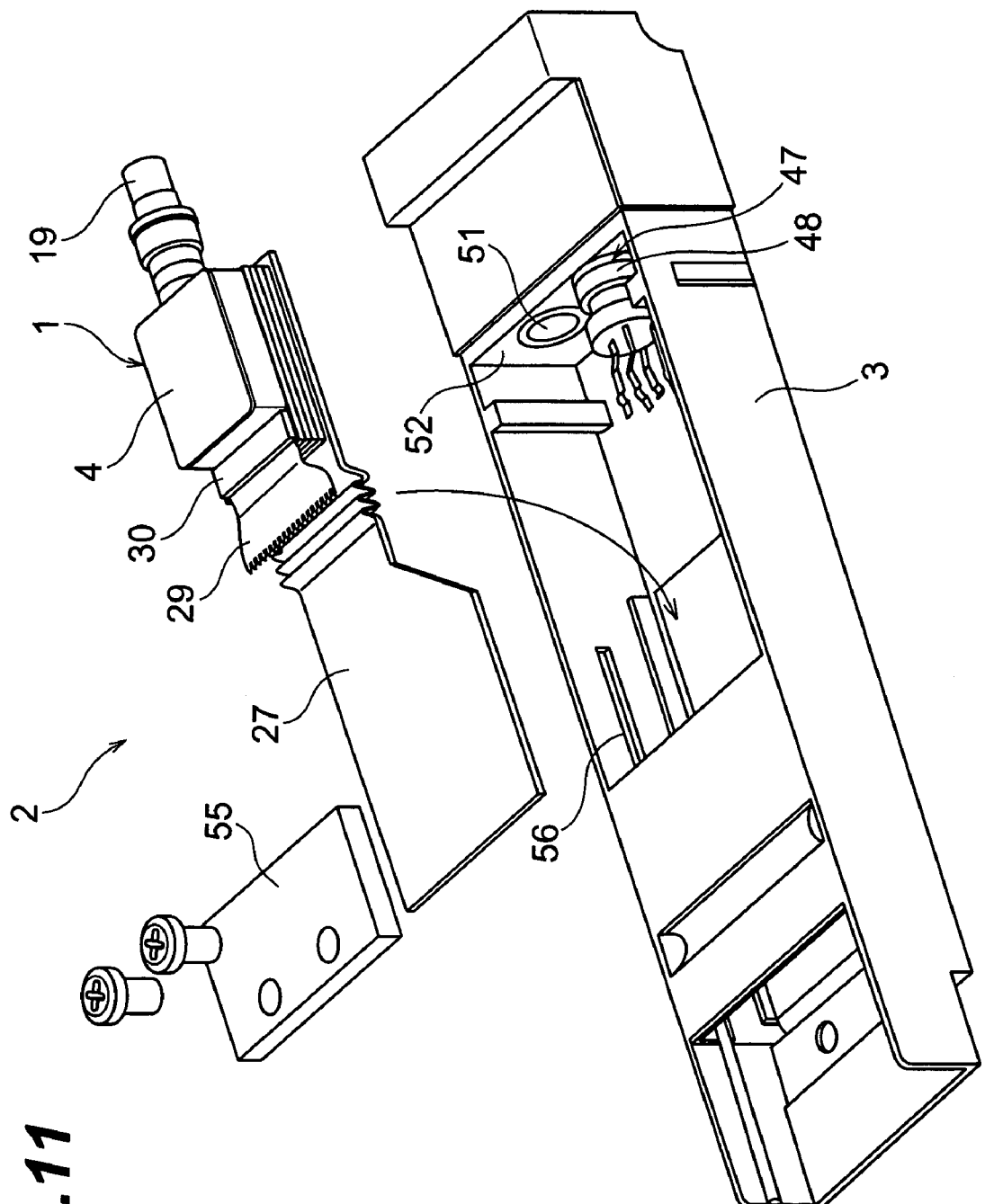
FIG. 11 is a perspective view showing how the optical device is installed into the body shown in FIG. 10.

As shown in FIGS. 2 and 11, the body 3 has a wall 52 with two through holes 51 engageable with the sleeve 19 of the optical transmitting device 1 and the sleeve 48 of the optical receiving device 47 to position them. When the optical transmitting device 1 is installed in the body 3, the sleeve 19 is inserted into the through hole 51 so that the flange 20a abuts the wall 52 and the distal end portion of the sleeve 19 is placed in the receptacle 50.

Thus the position of the sleeve 19 relative to the receptacle 50 will be fixed in the axial and radial directions of the sleeve 19, which are perpendicular to each other. This ensures relative positional accuracy between the receptacle 50 and the sleeve 19, so that the optical connector 49 can be reliably attached to and detached from the hollow portion 25 of the sleeve 19. Moreover, unevenness in the optical coupling efficiency between the ferrule 65 of the connector plug 49 and the sleeve 19 may be reduced.

When the optical transmitting device 1 and the optical receiving device 47 are installed in the body 3, a stopper 53 is used to press and hold the sleeves 19 and 48, as shown in FIG. 10. This prevents the optical transmitting device 1 and the optical receiving device 47 from moving along the length of the body 3.

Figure 12:
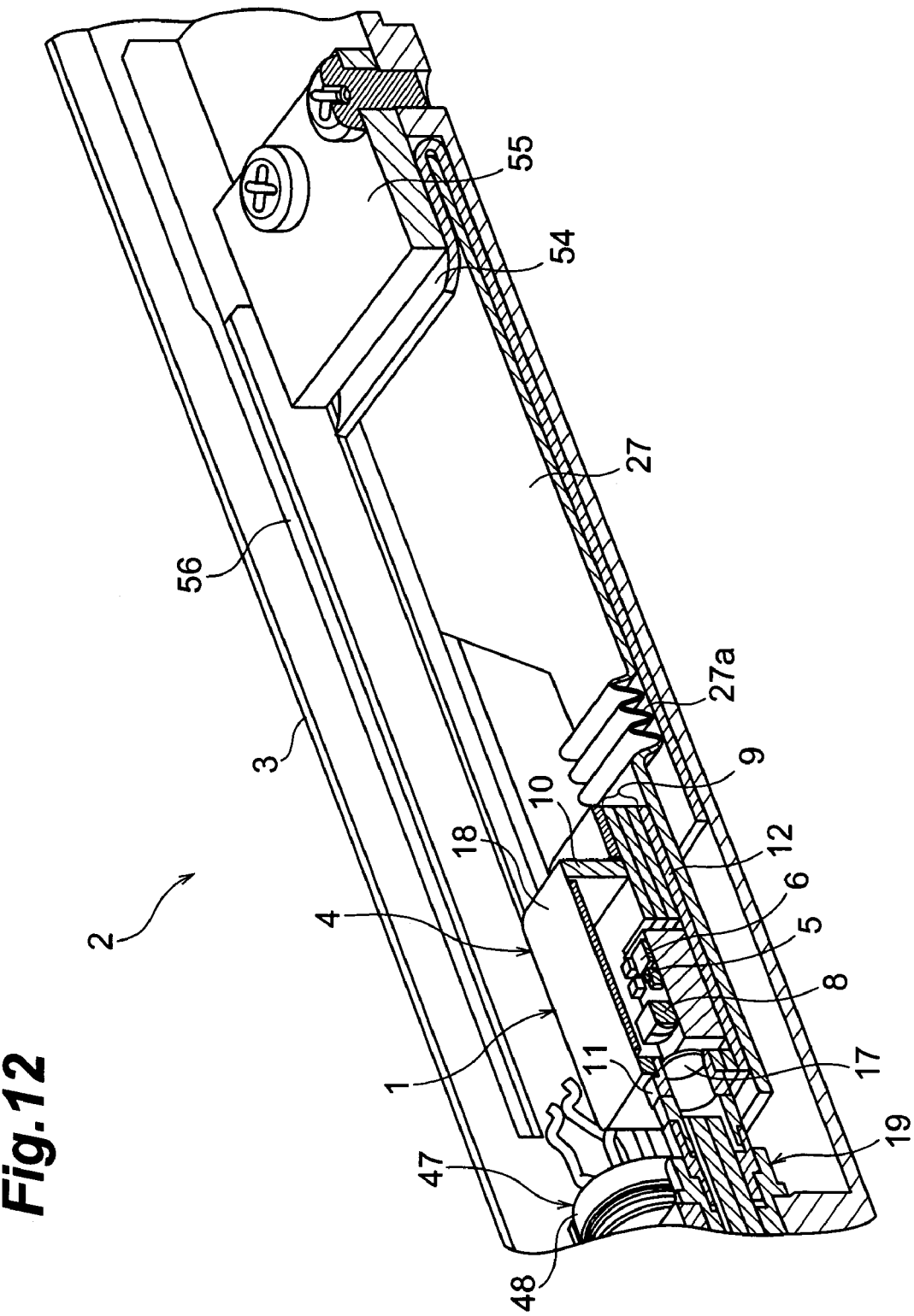
FIG. 12 is a partially sectional perspective view, showing a structure for fixing the heat-dissipating sheet to the inner wall of the body shown in FIG. 10.

An end portion of the heat-dissipating sheet 27 is fixed to the rear portion of the body 3. As shown in FIG. 12, the heat-dissipating sheet 27 is held by an installation sheet 54 with folded configuration, and fixed on the inner wall of the body 3 by a plate 55. Method of fixing the heat-dissipating sheet 27 is not limited to the one mentioned above. The heat-dissipating sheet 27 itself may have a hole into which a screw is inserted to fix the heat-dissipating sheet 27 to the body 3, or the sheet 27 may be bonded to the body 3 with adhesive.

When fixing the heat-dissipating sheet 27 to the body 3, the sleeve 19 is attached to the package 4 after optical alignment of the sleeve 19 with respect to the package 4 is performed so that some positional deviation occurs between the package 4 and the sleeve 19. However, the heat-dissipating sheet 27 is flexible and thus can be fixed to the body 3, permitting the positional deviation.

Since such a heat-dissipating sheet 27 thermally connects the package 4 and the body 3, the heat generated within the package 4 is dissipated to the body 3 and cover 46 through the sheet 27. When the optical module 2 is attached to the board 43 as shown in FIG. 9, the heat transferred to the body 3 and cover 46 propagates to the cage 45 and radiates to the air.

The heat-dissipating sheet 27 is electrically conductive as mentioned above. Therefore, if the bottom plate 12 of the package 4 is made of metal, the body 3, which is chassis ground, the bottom plate 12, and the mount 13 are at the same potential. Namely, the bottom plate 12 and the mount 13 are at the same ground potential as the body 3. As a consequence, the ground potential of the optical transmitting device 1 becomes stable, and therefore a high-frequency characteristic of the optical transmitting device 1 can be enhanced. Also, the electromagnetic noise emitted from the optical transmitting device 1 is suppressed.

The electronic circuit board 32 is also installed in the body 3. The circuit board 32 is held by the body 3 with guides 56 (see FIGS. 10 to 12), which is provided on the inner side wall of the body 3, so as to be parallel to the top surface of the wiring board 9. As shown in FIG. 10, notches 57 are formed on the both side edges of the circuit board 32. When installing the circuit board 32 in the body 3, a board stopper 58 engages with the notches 57, thereby preventing the circuit board 32 from moving.

The circuit board 32 has terminals 59 and 60 at one end thereof. The comb-shaped electrode 31 of the flexible printed board 29 is connected to the terminal 59 by soldering. The lead pins 61 of the optical receiving device 47 are connected to the terminal 60 by soldering (see FIG. 2).

Using the flexible printed board 29 in this way can connect the wiring board 9 and the circuit board 32 to each other while permitting the positional deviation (mentioned above) between the package 4 and the body 3. When the IC 6 for driving the LD 5 is provided, the optical transmitting device 1 requires as many as 10 to 20 electric interfaces. Even in such a case, the wiring board 9 and the circuit board 32 can be simply and reliably connected to each other.

Figure 13:
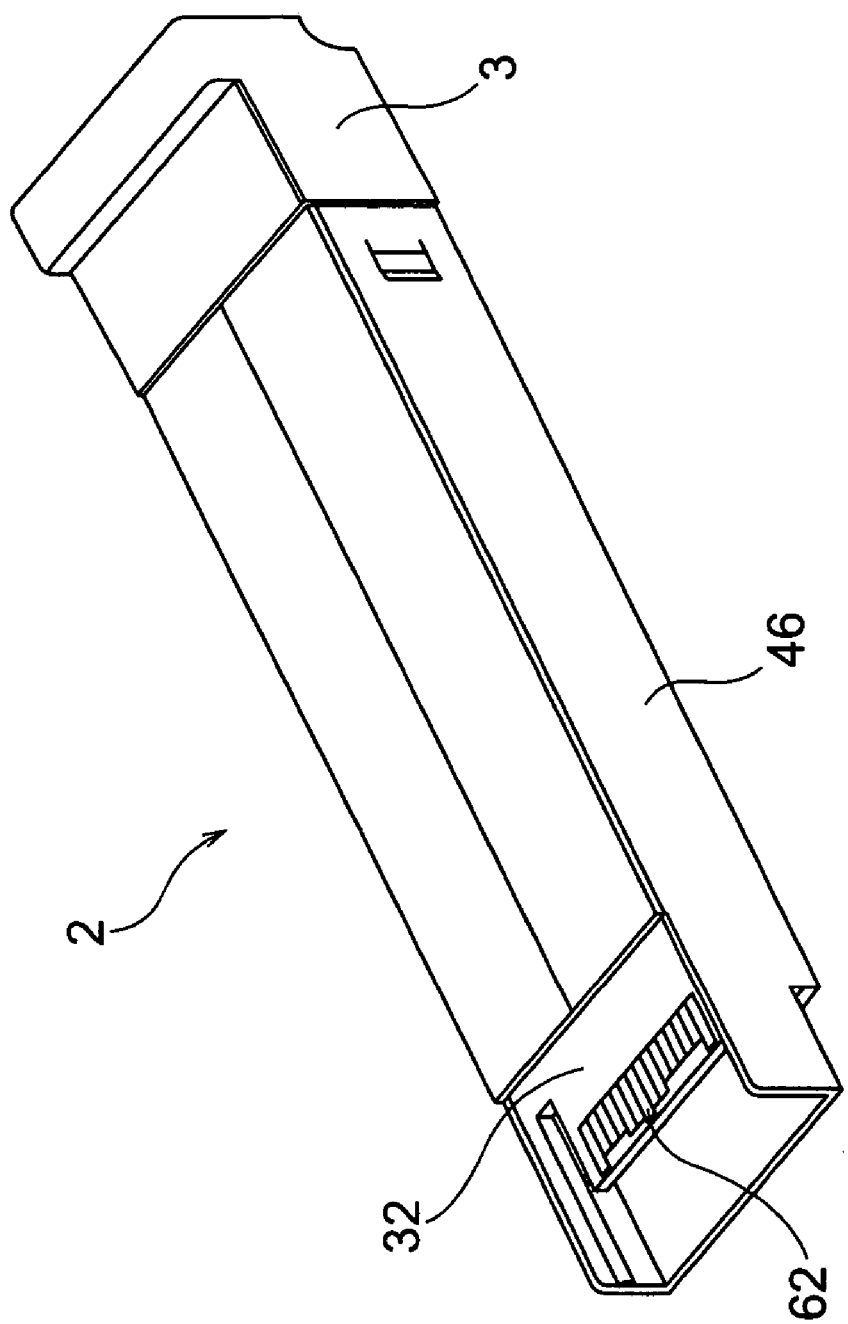
FIG. 13 is a perspective view showing the optical module shown in FIG. 10 which is completely assembled.

Another terminal 62 is formed at the opposite end of the circuit board 32. The terminal 62 is to be made electric contact with the host connector 44 (see FIG. 8), and is exposed from the cover 46, as shown in FIG. 13.

Figure 14:
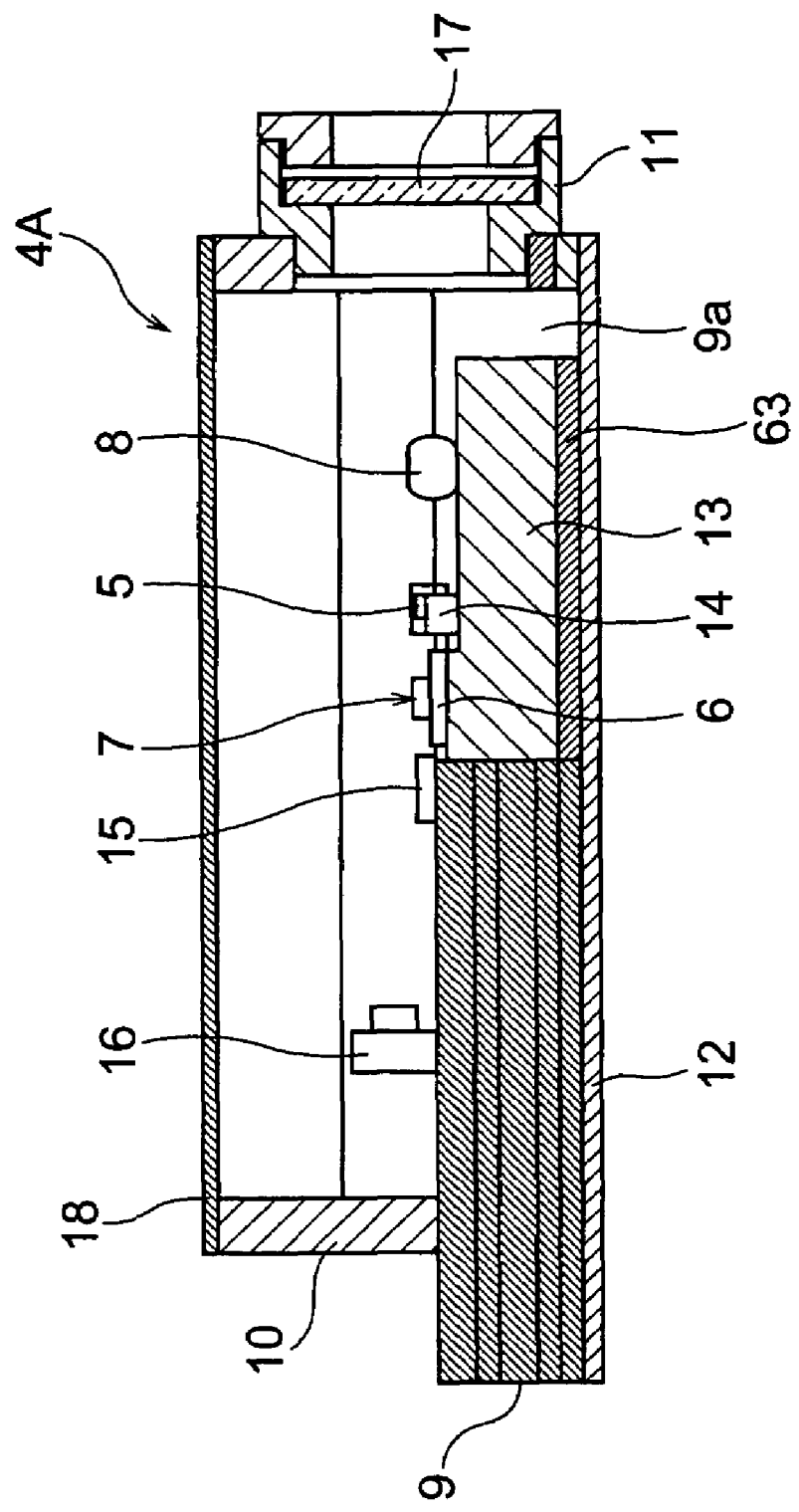
FIG. 14 is a sectional view showing another package in the optical device shown in FIG. 1.
Figure 15:
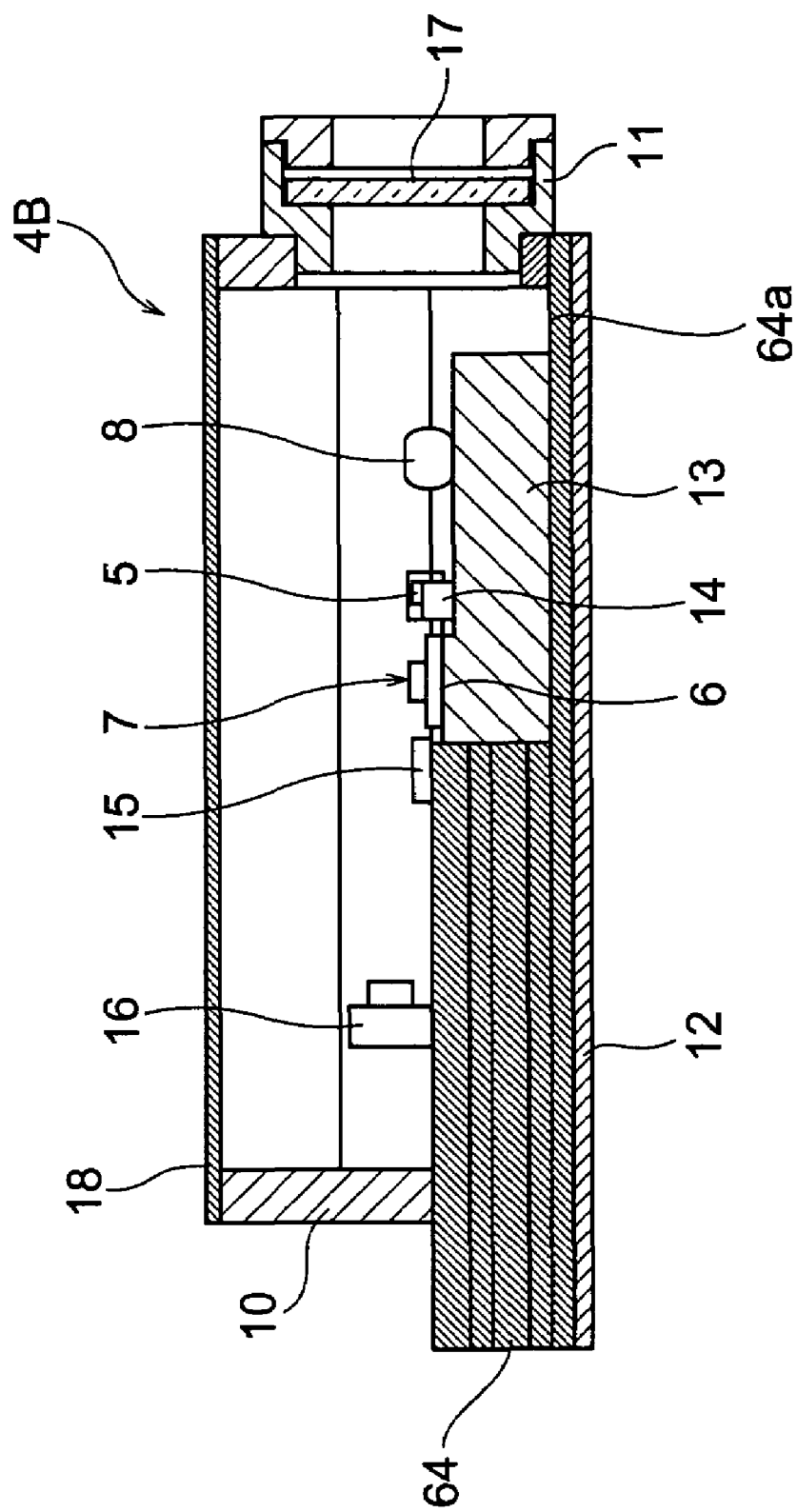
FIG. 15 is a sectional view showing still another package in the optical device shown in FIG. 1.
Figure 16:
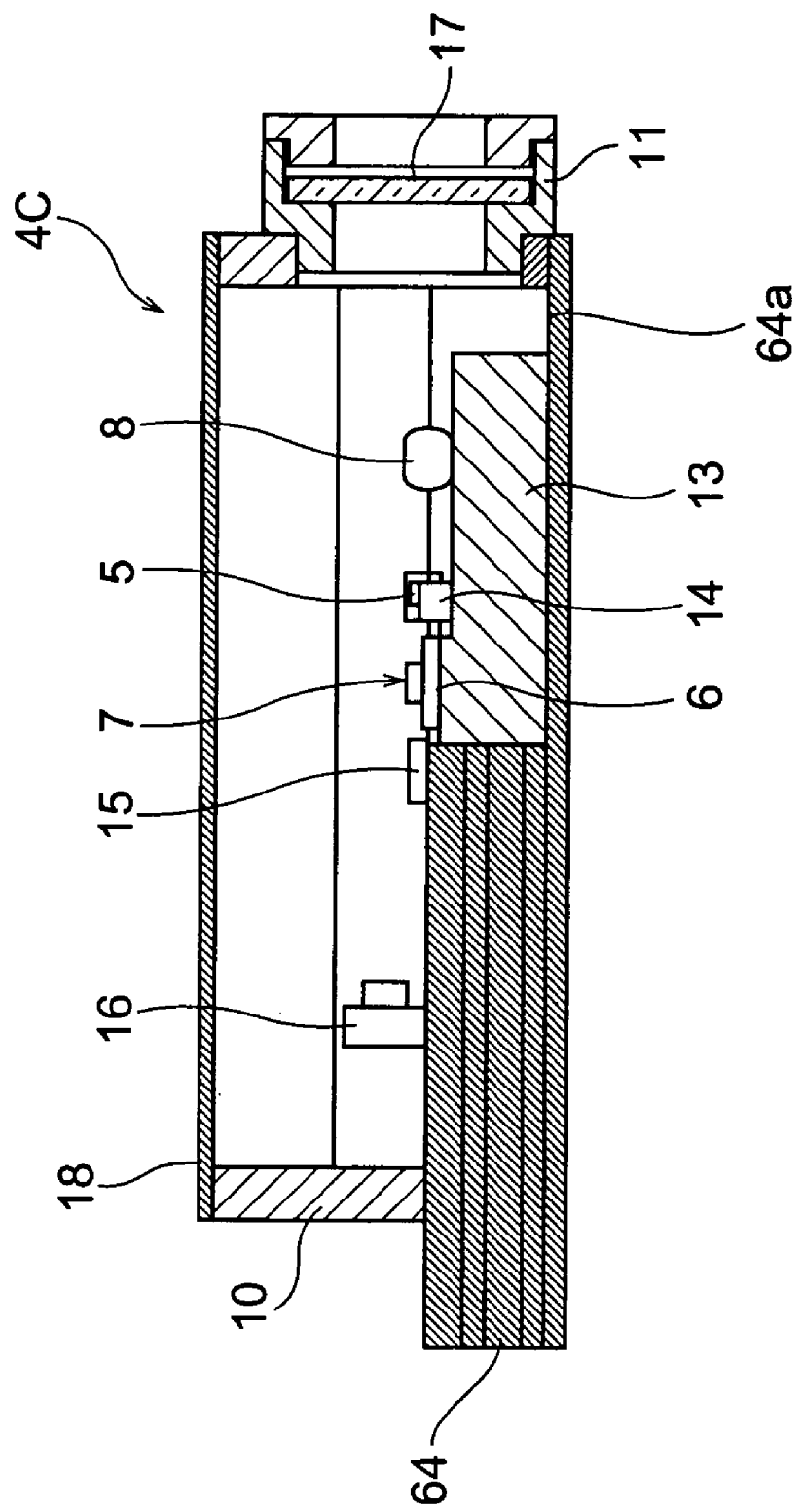
FIG. 16 is a sectional view showing still another package in the optical device shown in FIG. 1.

In this embodiment, the bottom plate 12 of the optical device 1 is made of electrically insulating material when the mount 13 and the body 3 of the optical module 2 are to be electrically isolated from each other. Alternatively, the package 4 of the optical device 1 may be modified so that the mount 13 and the body 3 are electrically isolated from each other. FIGS. 14 to 16 show such packages.

FIG. 14 shows the package 4A in which an insulating plate 63 is disposed between the bottom plate 12 and the mount 13. The package 4A has otherwise the same configuration as that of the package 4. In FIG. 4, even when the bottom plate 12 is made of metal, the mount 13 and the body 3 can be electrically isolated from each other without modifying the wiring board 9.

FIG. 15 shows the package 4B in which the lowermost layer 64a of the wiring board 64 made of laminated ceramic extends from the other layers and the mount 13 is disposed on the lowermost layer 64a. The package 4B has otherwise the same configuration as that of the package 4. In this case, even when the bottom plate 12 is made of metal, the mount 13 and the body 3 can be electrically isolated from each other without any additional component.

FIG. 16 shows the package 4C in which the lowermost layer 64a of the wiring board 64 extends from the other layers, the mount 13 is disposed on the lowermost layer 64a and the heat-dissipating sheet 27 (not shown in FIG. 16) is attached to the back surface (bottom surface) of the wiring board 64. The package 4C has otherwise the same configuration as that of the package 4. In this case, the mount 13 and the body 3 can be electrically isolated from each other without providing the bottom plate 12 under the wiring board 64.

Second Embodiment

Figure 17:
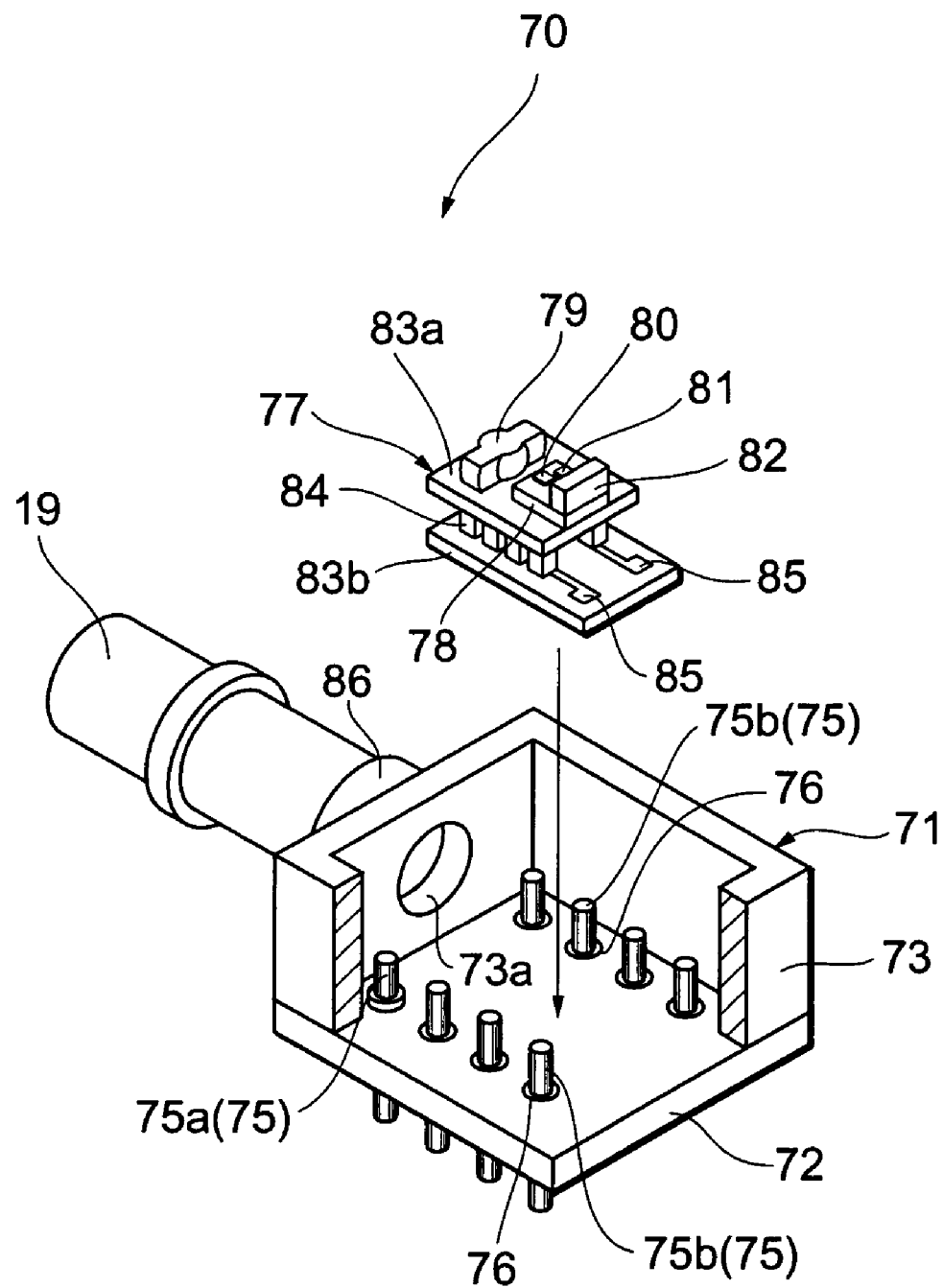
FIG. 17 is an exploded perspective view partially showing another embodiment of the optical device in accordance with the present invention.

FIG. 17 is an exploded schematic view partially showing a second embodiment of the optical device in accordance with the present invention. The optical device 70 of this embodiment is an optical transmitting device with a thermo-electronic element. The optical transmitting device 70 has a box-shaped package 71 of a so-called DIP (Dual-Inline Package) type. The package 71 is composed of a bottom plate 72, frame 73 fixed on the bottom plate 72, and a lid 74 (see FIG. 18) provided on the top of the frame 73. All the bottom plate 72, frame 73 and lid 74 are made of metal.

A plurality of (eight in this embodiment) lead pins 75 are provided on the bottom plate 72. One of the lead pins 75 is used as a case lead pin 75*a*. The case lead pin 75*a* is fixed on the bottom plate 72 by brazing or welding. The bottom plate 72, the frame 73 and the case lead pin 75*a* are set at the same potential. The other lead pins 75*b* are inserted into through holes of the bottom plate 72 and fixed on the bottom plate 72 with sealing glass 76. This keeps electrical insulation between the lead pins 75*b* and the bottom plate 72.

A thermo-electronic element 77 is mounted on the top surface of the bottom plate 72, and a substrate 78 and a lens 79 are placed on the thermo-electronic element 77. The substrate 78 is made of electrically insulating material such as aluminum nitride, alumina or the like.

A wiring pattern (not shown) is provided on the top surface of the substrate 78 on which a light-emitting element (LD in this embodiment) 80, thermistor 81 and PD carrier 82 with light-receiving element (PD in this embodiment) for monitoring light emitted backwardly from the LD 80 are disposed. A printed resistor may be formed on the wiring pattern, and also one or more electronic components such as a capacitor may be placed on the wiring pattern. A driver circuit (not shown) for driving the LD 80 is placed outside the package 71 in this embodiment; however, the driver circuit may be mounted on the substrate 78. Electrode pads (not shown) are provided on the substrate 78 and the PD carrier 82, and they are electrically connected to the lead pins 75 via bonding wires.

Figure 19A:
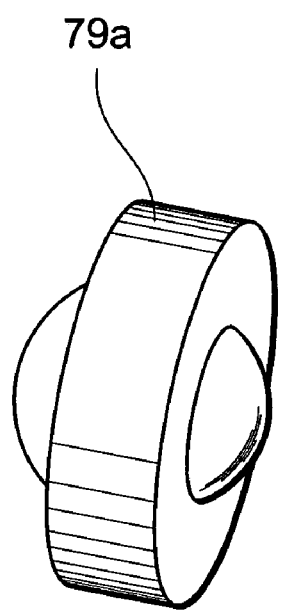
FIGS. 19A and 19B are perspective views of the lens for the embodiment shown in FIG. 17 before and after 2-facet cut.
Figure 19B:
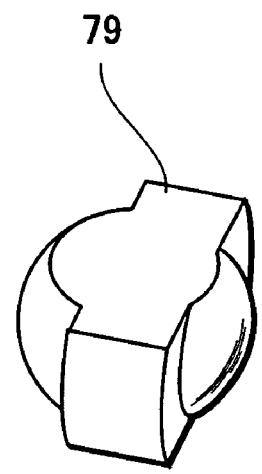

The lens 79 is used to convert light generated in the LD 80 into convergent light. For example, 2-facet cut aspheric lens shown in FIGS. 19A and 19B may be used as the lens 79; however, the lens 79 is not limited to this lens. FIG. 19A shows a lens 79*a* before the 2-facet cut, and FIG. 19B shows the lens 79 which has been subjected to the 2-facet cut. An additional lens and an optical isolator may be placed on the thermo-electronic element 77. The light generated in the LD 80 is converted into substantially parallel light, and then converted into convergent light by the additional lens.

The thermo-electronic element 77 adjusts the temperature of the LD 80. The thermo-electronic element 77 has two insulating boards 83*a* and 83*b*, and p-type and n-type peltier elements 84 are alternately sandwiched between the boards 83*a* and 83*b*. The substrate 78 and the lens 79 are mounted on the upper board 83*a*. Two electrode pads 85 are provided on the lower board 83*b*, and electrically connected to the lead pins 75 via bonding wires, lead wires or the like.

An aperture 73*a* for transmitting the light from the LD 80 is formed in the front wall of the frame 73. A pipe 86 is provided on the front surface of the frame 73 so as to be connected to the aperture 73*a*, and a sealed window (not shown) is disposed within the pipe 86. The above-mentioned sleeve 19 is attached to the pipe 86.

After The thermo-electronic element 77 with the lens 79, LD 80, thermistor 81 and the other components are mounted on the top surface of the bottom plate 72 with the frame 73 fixed thereon, the package 71 is hermetic-sealed by seam-welding the lid 74 to the top of the frame 73. Thereafter, the sleeve 19 is optically aligned with the LD 80 as described above, and then the sleeve 19 is fixed to the pipe 86.

Figure 18:
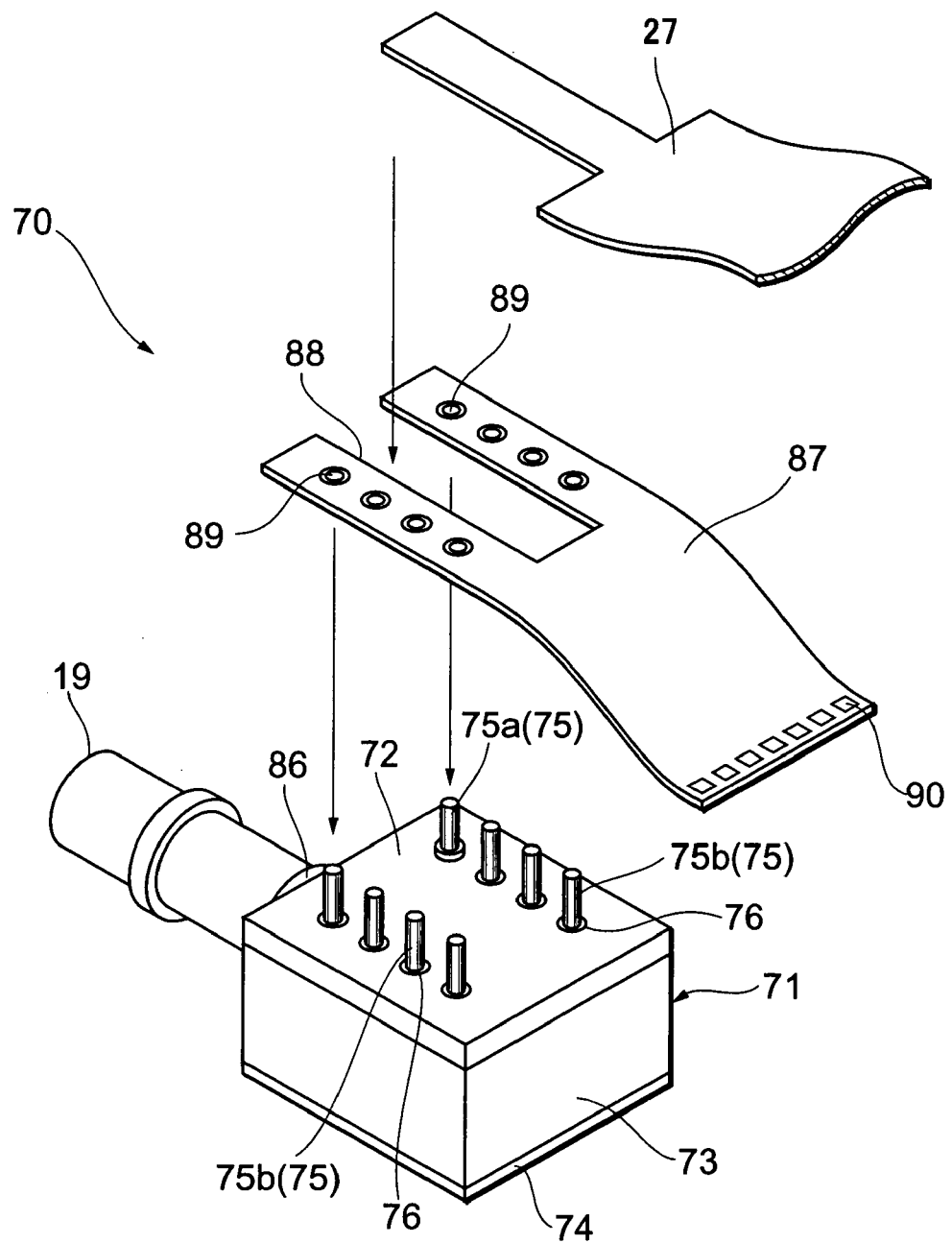
FIG. 18 shows an example of the mechanics for attaching the flexible printed board and the heat-dissipating sheet to the package shown in FIG. 17.

A flexible printed board 87 and the above heat-dissipating sheet 27 are attached to the package 71 as shown in FIG. 18. One end of the flexible printed board 87 has a rectangular notch 88 used for fixing the sheet 27 on the bottom surface of the package 71 (bottom plate 72). Lands 89 are provided on the both sides of the notch 88 of the flexible printed board 87. The lands 89 have through holes into which the lead pins 75 are inserted. Pads 90, which are to be electrically connected to the electronic circuit board 32 (see FIG. 2) in the body 3, are provided on the opposite end of the flexible printed board 87.

The flexible printed board 87 is fixed on the bottom surface of the package 71 by soldering the lead pins 75 to the lands 89, and then an end of the heat-dissipating sheet 27 is directly connected to the bottom surface of the package 71 by soldering.

Alternatively, a rigid board may be attached to a portion of the flexible printed board 87, and the lands 89 and 90 may be provided on the rigid board.

Figure 20:
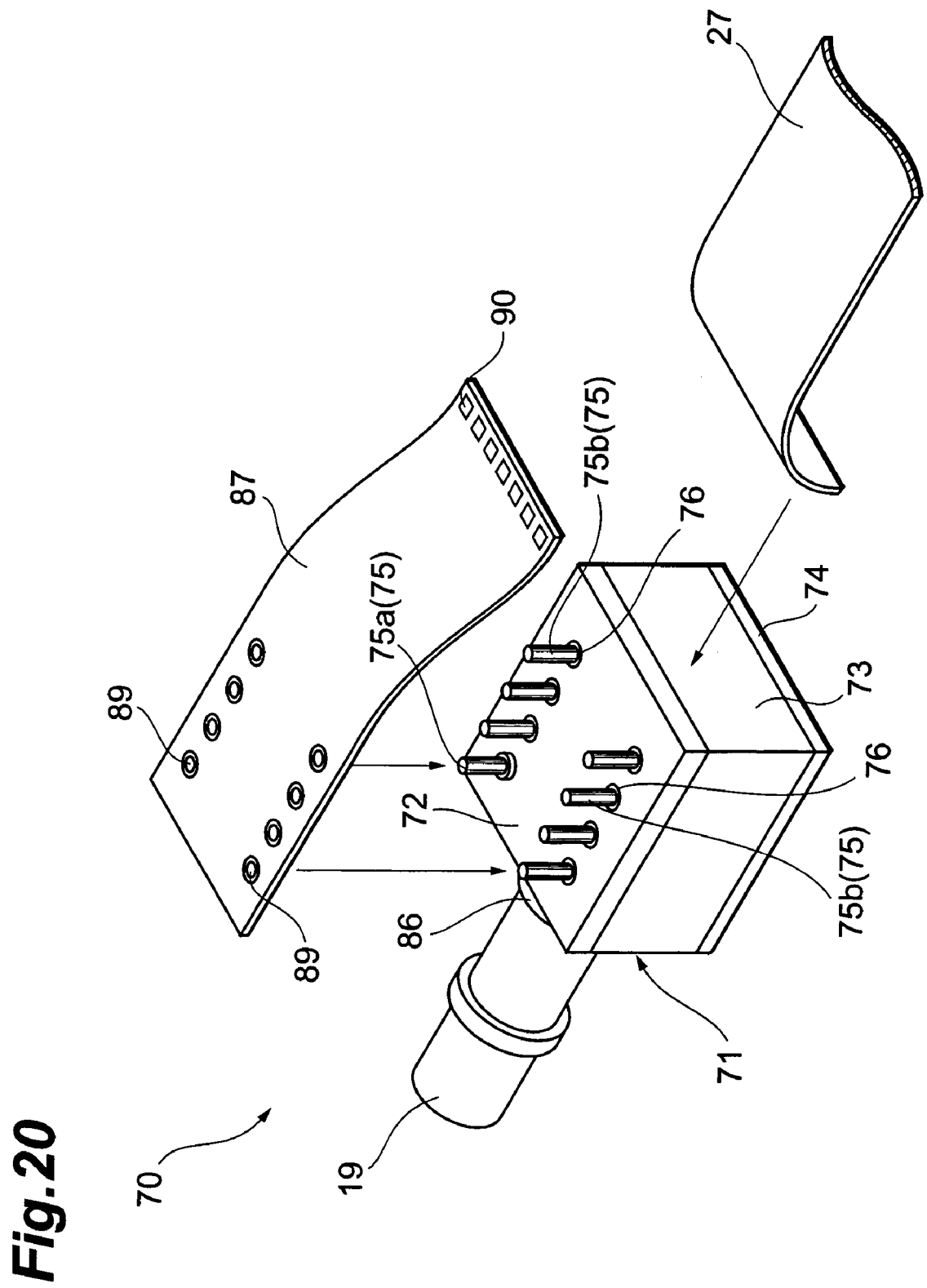
FIG. 20 shows another example of the mechanics for attaching the flexible printed board and the heat-dissipating sheet to the package shown in FIG. 17.

The heat-dissipating sheet 27 may be attached to the rear surface of the package 71 (frame 73), as shown in FIG. 20. In this case, the notch 88 is not necessary on the flexible printed board 87.

When DFB (Distributed Feed-Back) type laser diode integrated with EA (Electro-Absorption) modulator (i.e., EA-DFB element) is used as the light emitting element 80, a thermo-electronic element is necessary because of strong temperature dependence of characteristics of the EA-DFB element. The thermo-electronic element is also necessary when the optical transmitting device 70 is applied to an optical transmitting module for WDM which requires precise wavelength control. Using the thermo-electronic element consumes electric power of about 0.5 to 1 W. Accordingly, a large amount of heat is generated in the package 71 which encloses the thermo-electronic element 77. However, the heat is efficiently dissipated through the sheet 27, thereby suppressing deterioration of characteristics of the LD 80 caused by the heat.

Third Embodiment

Figure 21:
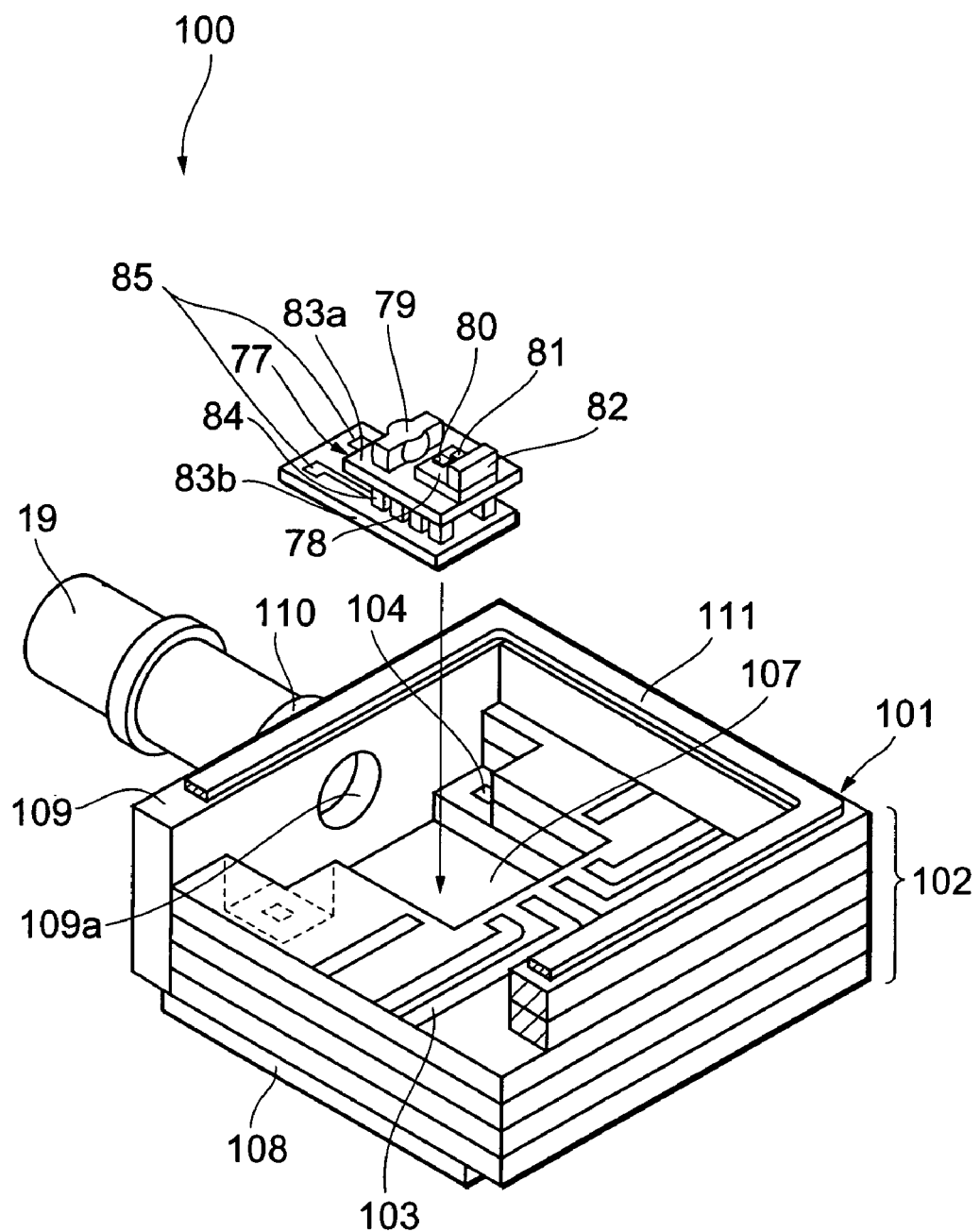
FIG. 21 is an exploded perspective view partially showing still another embodiment of the optical device in accordance with the present invention.
Figure 22:
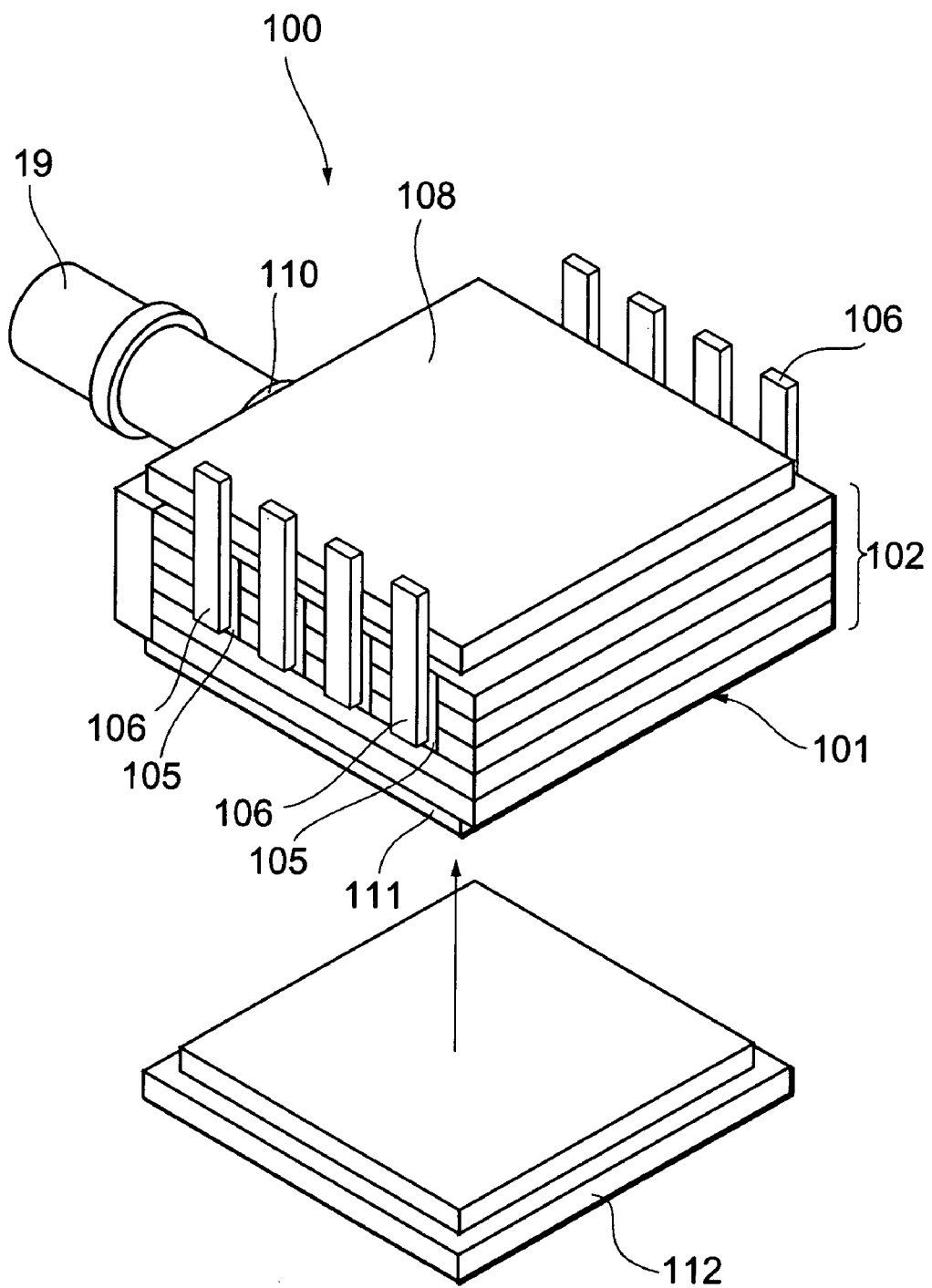
FIG. 22 is an exploded perspective view showing the package shown in FIG. 21 from another direction.

FIG. 21 is an exploded schematic view partially showing a third embodiment of the optical device in accordance with the present invention. The optical device 100 has a box-shaped package 101 instead of the package 71 in the second embodiment. The package 101 has a laminated ceramic part 102 as a main body of the package 101, and the part 102 includes a surface layer and inner layers each having a plurality of wiring patterns 103. The part 102 also has a plurality of pads 104 electrically connected to the wiring patterns 103, and bonding pads (not shown) for wire bonding. Moreover, a plurality of metal patterns 105 are provided on the two side surfaces, which are opposite to each other, of the part 102, and a lead pin 106 is fixed on each metal pattern 105, as shown in FIG. 22.

The laminated ceramic part 102 includes a cavity 107. A bottom plate 108 made of CuW is fixed on the bottom surface of the part 102. The thermo-electronic element 77 mounting components such as the LD 80 and thermistor 81 is fixed on the top surface, which is exposed through the cavity 107, of the bottom plate 108.

The pads 85 of the thermo-electronic element 77 are electrically connected to the pads 104 of the laminated ceramic part 102 via bonding wires. The bonding pads (not shown) on the substrate 78 are electrically connected to the bonding pads (not shown) of the part 102 via bonding wires. The components on the substrate are electrically connected to the lead pins 106 through the bonding pads and the bonding wires.

A wall 109 made of Kovar™ is fixed on one of the end surfaces, that is, the front end surface, of the laminated ceramic part 102. An aperture 109*a* for transmitting the light from the LD 80 is formed in the wall 109. The sleeve 19 is attached to the wall 109 via a pipe 110. The wall 109 may be integral with the laminated ceramic part 102.

A seal ring 111 made of Kovar™ is disposed on the top surfaces of the laminated ceramic part 102 and the wall 109. The laminated ceramic part 102, lead pins 106, bottom plate 108, wall 109 and seal ring 111 are assembled together by silver brazing, and then a lid 112 is seam-welded to the seal ring 111, as shown in FIG. 22. This ensures hermetic-sealing of the package 101.

The flexible printed board 87 and the heat-dissipating sheet 27 previously described are attached to the bottom surface of the package 101 though they are not shown in FIGS. 21 and 22. The lead pins 106 fixed on the sides of the laminated ceramic part 102 extend in a direction substantially perpendicular to the bottom surface of the package 101. Hence, the printed board 87 and the sheet 27 can be attached to the package 101 by the method similar to those shown in FIGS. 18 and 20.

Fourth Embodiment

Figure 23:
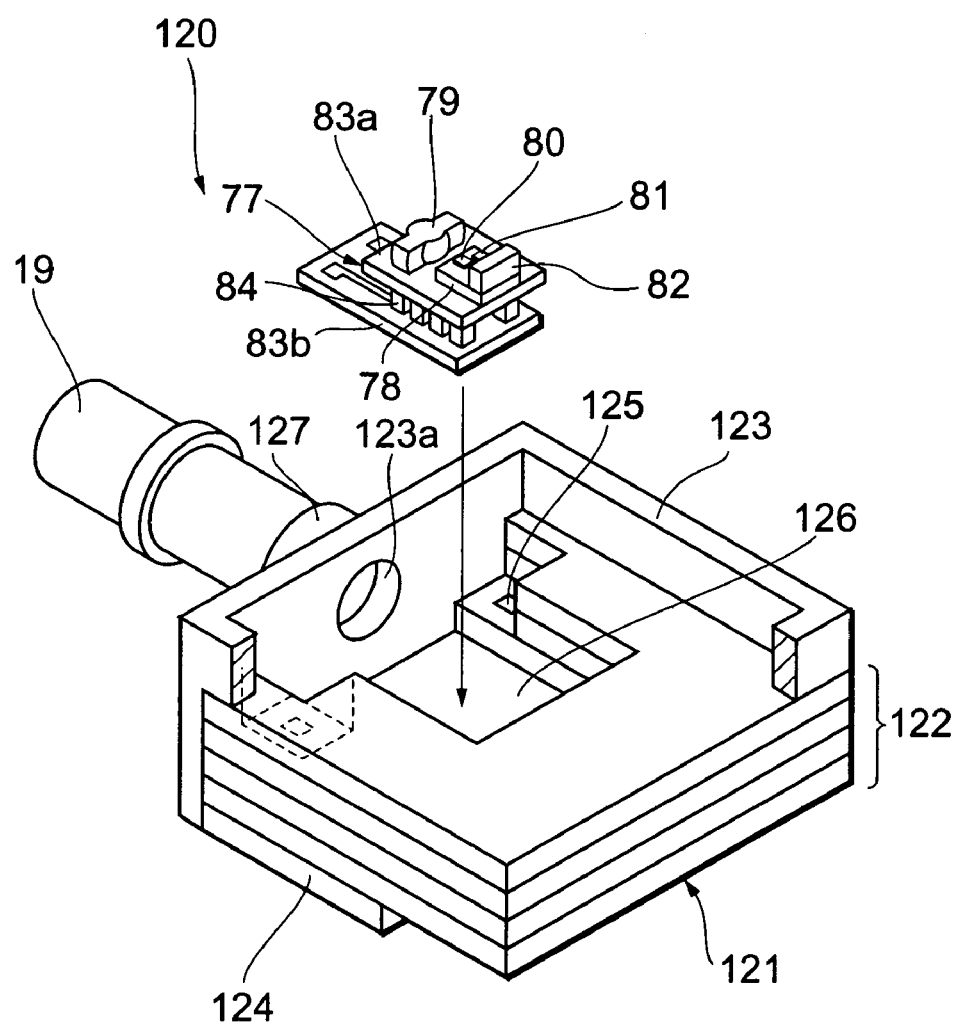
FIG. 23 is an exploded perspective view partially showing further embodiment of the optical device in accordance with the present invention.

FIG. 23 is an exploded schematic view partially showing a fourth embodiment of the optical device in accordance with the present invention. The optical device 120 of this embodiment has a box-shaped package 121 instead of the package 71 in the second embodiment.

The package 121 has a laminated ceramic part 122, a metal frame 123 fixed thereon, and a metal bottom plate 124 fixed on the bottom surface. The laminated ceramic part 122 includes a surface layer and inner layers each having a plurality of wiring patterns (not shown). The laminated ceramic part 122 also has a plurality of pads 125 electrically connected to the wiring patterns, and bonding pads (not shown) for wire bonding.

The laminated ceramic part 122 includes a cavity 126. The thermo-electronic element 77 with the components such as the LD 80 and thermistor 81 is fixed on the top surface, which is exposed through the cavity 126, of the bottom plate 124. The LD 80 and thermistor 81 are electrically connected to the pads 125 (see FIG. 24) provided on the bottom surface of the laminated ceramic part 122.

An aperture 123a for transmitting the light from the LD 80 is formed through the front wall of the frame 123, and the sleeve 19 is attached to the front surface of the frame 123 via a pipe 127. A lid 128 (see FIG. 24) is fixed on the top surface of the frame 123 by seam-welding, thereby hermetic-sealing the package 121.

Figure 24:
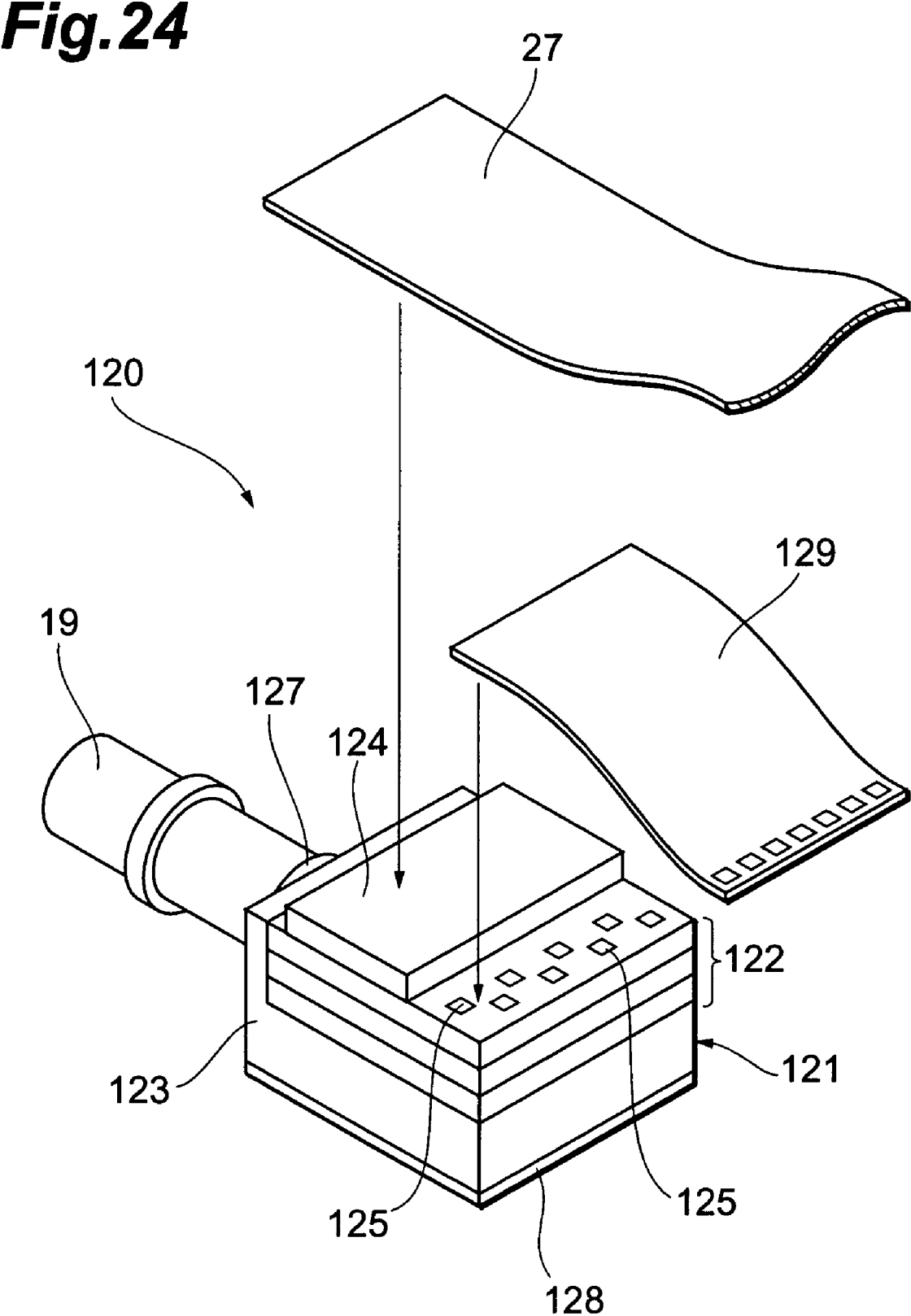
FIG. 24 is a view showing the mechanics for attaching the flexible printed board and the heat-dissipating sheet to the package shown in FIG. 23.

As shown in FIG. 24, a flexible printed board 129 and the above heat-dissipating sheet 27 are attached to the bottom surface of the package 121. The sheet 27 is soldered to the bottom plate 124 of the package 121.

A plurality of flexible pads (not shown) are provided on an end of the flexible printed board 129. The pads are to be soldered to the respective pads 125 on the bottom surface of the laminated ceramic part 122. When attaching the flexible printed board 129 to the package 121, solder balls are placed on either the pads 125 of the laminated ceramic part 122 or the pads of the flexible printed board 129, and then the package 21 and the flexible printed board 129 are thermally processed.

A rigid board may be attached to an end of the flexible printed board 129, and a plurality of pads may be provided on the rigid board. In this case, the flexible printed board 129 may be attached to the package 121 by placing solder balls on the pads on the rigid board and then thermally processing them.

Fifth Embodiment

Figure 25:
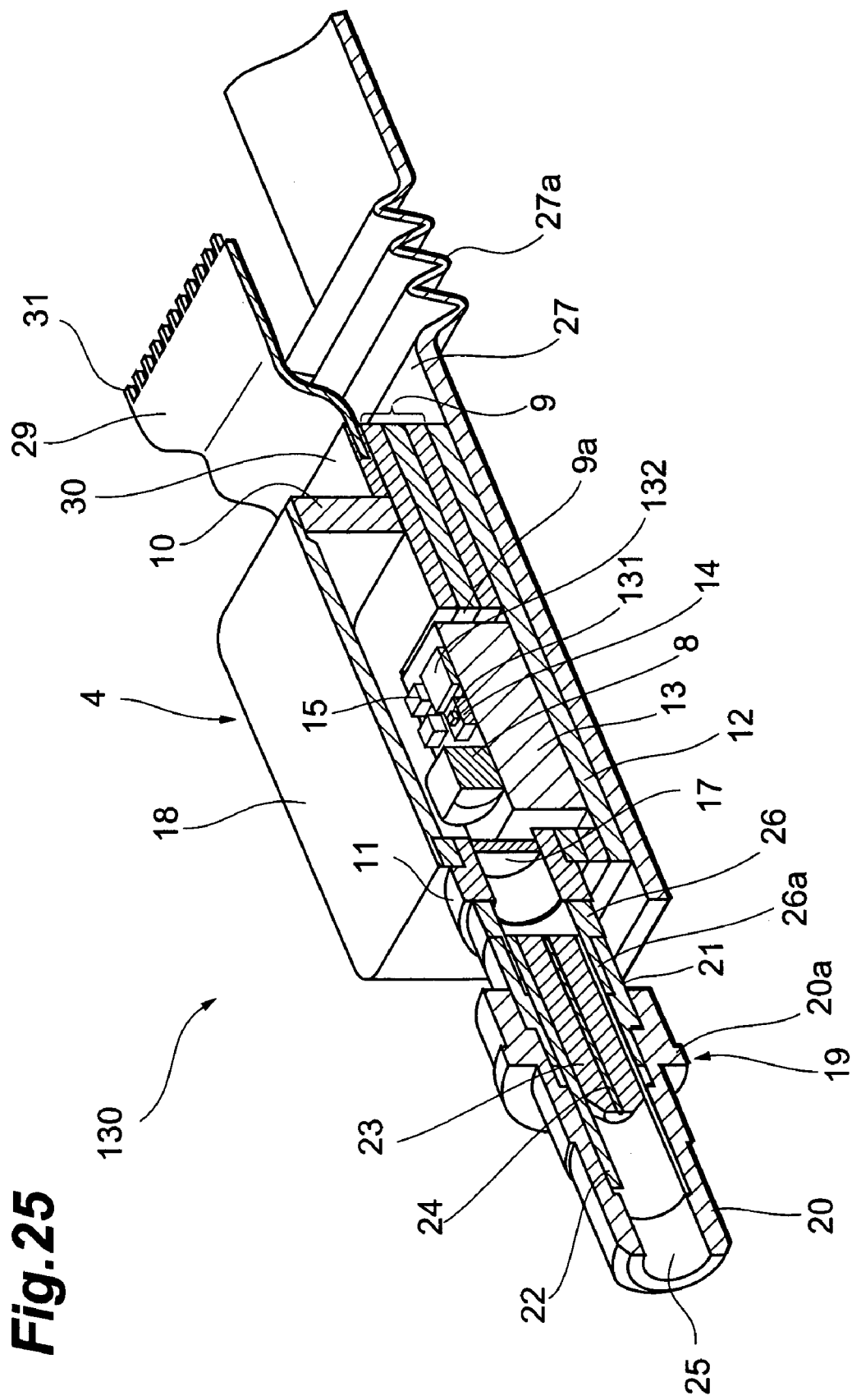
FIG. 25 is a partially sectional perspective view showing still further embodiment of the optical device in accordance with the present invention.

FIG. 25 is a schematic view showing a fifth embodiment of the optical device in accordance with the present invention. The optical device 130 of this embodiment is an optical receiving device. The optical receiving device 130 has a light-receiving element 131 and an amplifier circuit 132 instead of the light-emitting element 5 and the driver circuit 7 in the first embodiment.

The light-receiving element 131 receives optical signals emitted from the optical fiber 24 in the sleeve 19. A PIN photodiode or an avalanche photodiode may be used as the light-receiving element 131. The amplifier circuit 132 amplifies the output signal of the light-receiving element 131.

The power consumption of the light-receiving element 131 is very small; however, in high speed communication, power of about 0.5 W may be consumed in the amplifier circuit 132. Even in this case, heat generated by the amplifier circuit 132 is efficiently dissipated to the heat-dissipating sheet 27.

The present invention is not limited to the above embodiments. For example, though the packages enclosing the optical elements are hermetic-sealed in the above embodiments, the optical elements may be resin-sealed, in particular, in optical devices without a thermo-electronic element. If the optical element is butt-coupled to an optical fiber, the sealing may be performed by covering the optical element and the butt-coupled end face of the optical fiber with transparent resin.

Though the above embodiments use the sleeve 19 including the capillary 23 holding the optical fiber 24, the light from the LD 5 may travel without the capillary 23. In this case, a portion for positioning the ferrule 65 of the optical connector 49 is provided within the sleeve.

Though the optical modules include both the optical transmitting device and the optical receiving device, the present invention is also applicable to an optical transmitting module including a plurality of optical transmitting devices.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical device, comprising:
   a laser diode generating heat;
   a package including a bottom plate and a frame mounted on said bottom plate, said bottom plate and said frame being made of metal;
   a wiring board mounted on said bottom plate and made of laminated ceramic;
   a mount disposed on said bottom plate and made of metal, said mount mounting said laser diode thereon;
   a driver circuit electrically connected to said wiring board for driving said laser diode, said driver circuit being mounted on said mount; and
   a flexible heat dissipating sheet directly in contact with said bottom plate to dissipate said heat generated by said laser diode,
   heat generated by said driver circuit and said laser diode being conducted to the outside of said package through said mount and said flexible heat dissipating sheet.

2. The optical device according to claim 1,
   wherein said heat dissipating sheet has a corrugated portion to secure a flexibility of said heat dissipating sheet.

3. The optical device according to claim 2, wherein said heat dissipating sheet is made of Cu or graphite.

4. The optical device according to claim 1, wherein said mount is made of CuW.

5. The optical device according to claim 1, further including an insulating plate disposed between said mount and said bottom plate.

6. The optical device according to claim 5, wherein said insulating plate extends from a lowermost portion of said laminated ceramic of said wiring board.

7. The optical device according to claim 6, wherein said heat dissipating sheet is directly in contact with said lowermost portion of said laminated ceramic.

8. An optical device for emitting light, comprising:
a light-emitting element generating heat;
a box-shaped package including a metal bottom plate and a metal frame disposed on said metal bottom plate;
a thermo-electronic element disposed on said metal bottom plate for mounting said light-emitting element thereon; and
a flexible heat dissipating sheet for dissipating heat generated by said light-emitting element and said thermoelectric element;
a laminated ceramic part disposed on said metal bottom plate, said laminated ceramic part surrounding said thereto-electronic element,
said flexible heat dissipating sheet being directly in contact with an outer surface of said metal bottom plate.

9. The optical device according to claim 8, wherein said heat dissipating sheet is directly in contact with an outer surface of said metal frame.

10. The optical device according to claim 8, wherein said heat dissipating sheet has a corrugated portion to secure a flexibility of said heat dissipating sheet.

11. The optical device according to claim 10, wherein said heat dissipating sheet is made of Cu or graphite.

12. An optical module for emitting and receiving optical signals, comprising:
a body including an optical receptacle and having an inner wall; and
an optical device installed in said body, said optical device including a laser diode for emitting said optical signal, a flexible heat dissipating sheet, a package including a metal bottom plate, a frame and a sleeve disposed on said frame to be received in said optical receptacle,
wherein said flexible heat dissipating sheet is directly in contact with said bottom plate of said optical device and said inner wall of said body to conduct heat generated by said laser diode.

13. The optical module according to claim 12, wherein said heat dissipating sheet has a corrugated portion to secure a flexibility of said heat dissipating sheet.

14. The optical module according to claim 13, wherein said sheet dissipating sheet is made of Cu or graphite.

15. The optical module according to claim 12, wherein said heat dissipating sheet has a folded configuration at a contact point to said inner wall of said body.

16. The optical module according to claim 12, wherein said optical device further provides a thermoelectric cooler for controlling a temperature of said laser diode, said thermoelectric cooler being disposed on said bottom plate to conduct heat generated by said thermoelectric cooler.

17. The optical module according to claim 12, wherein said optical device further provides a driver circuit for driving said laser diode and a mount for mounting said driver circuit and said laser diode, said mount being disposed on said bottom plate to conduct heat generated by said laser diode and said driver circuit.

* * * * *